(12) United States Patent
Reuze et al.

(10) Patent No.: US 11,310,497 B2
(45) Date of Patent: Apr. 19, 2022

(54) GEOMETRIC PARTITION MODE WITH INCREASED EFFICIENCY

(71) Applicant: QUALCOMM Incorporated, San Diego, CA (US)

(72) Inventors: Kevin Pascal Andre Reuze, Rennes (FR); Han Huang, San Diego, CA (US); Chun-Chi Chen, San Diego, CA (US); Po-Han Lin, Taipei (TW); Wei-Jung Chien, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 13 days.

(21) Appl. No.: 17/078,710

(22) Filed: Oct. 23, 2020

(65) Prior Publication Data

US 2021/0152825 A1   May 20, 2021

Related U.S. Application Data

(60) Provisional application No. 62/958,566, filed on Jan. 8, 2020, provisional application No. 62/950,856, filed
(Continued)

(51) Int. Cl.
*H04N 19/119* (2014.01)
*H04N 19/167* (2014.01)
(Continued)

(52) U.S. Cl.
CPC ............. *H04N 19/119* (2014.11); *G06F 1/03* (2013.01); *H04N 19/167* (2014.11); *H04N 19/159* (2014.11); *H04N 19/176* (2014.11)

(58) Field of Classification Search
CPC .. H04N 19/119; H04N 19/167; H04N 19/176; H04N 19/159; G06F 1/03
(Continued)

(56) References Cited

U.S. PATENT DOCUMENTS

| 9,609,343 B1* | 3/2017 | Chen ..................... H04N 19/109 |
| 2016/0057447 A1* | 2/2016 | Pu ......................... H04N 19/186 |
| | | 375/240.12 |
| 2017/0025098 A1* | 1/2017 | Keramidas ............... G09G 5/39 |

OTHER PUBLICATIONS

Bross B., et al., "High Efficiency Video Coding (HEVC) Text Specification Draft 10 (for FDIS & Last Call)", 12th Meeting, Geneva, CH, Jan. 14-23, 2013, (Joint Collaborative Team on Video Coding of ISO/IEC JTC 1/SC 29/WG 11 and ITU-T SG 16 WP 3), JCTVC-L1003_v34, Mar. 19, 2013, 310 pages.
(Continued)

*Primary Examiner* — Tung T Vo
(74) *Attorney, Agent, or Firm* — Shumaker & Sieffert, P.A.

(57) ABSTRACT

An example device for decoding video data includes a memory configured to store the video data and one or more processors implemented in circuitry and coupled to the memory. The one or more processors are configured to determine a first distance index associated with a first geometric partition mode (GEO) angle for a first prediction unit (PU) of the video data to be 4. The one or more processors are configured to determine a first displacement value based on the first distance index, the first displacement value being indicative of a distance from a center of the first PU to a GEO split. The one or more processors are configured to decode the first PU based on the first GEO angle and the first displacement value. The first displacement value is half of a displacement value associated with a distance index of 2.

26 Claims, 31 Drawing Sheets

Related U.S. Application Data on Dec. 19, 2019, provisional application No. 62/935,846, filed on Nov. 15, 2019.

(51) Int. Cl.
*G06F 1/03* (2006.01)
*H04N 19/176* (2014.01)
*H04N 19/159* (2014.01)

(58) Field of Classification Search
USPC .................................................. 375/240.02
See application file for complete search history.

(56) References Cited

OTHER PUBLICATIONS

Bross B., et al., "Versatile Video Coding (Draft 6)", 127. MPEG and 15th JVET Meeting, Jul. 3-12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Chen J., et al., "Algorithm Description for Versatile Video Coding and Test Model 5 (VTM 5)", 14th JVET Meeting, Mar. 19-27, 2019, Geneva, (The Joint Video Exploration Team of ISO/IEC JTC1/SC29/WG11 and ITU-T SG.16), No. JVET-N1002-v1, May 21, 2019, XP030205194, 70 Pages, Retrieved from the Internet: URL:http://phenix.int-evry.fr/ivet/doc_end_user/documents/14_Geneva/wg11/JVET-N1002-v1.zip JVET-N1002-v1.docx.

Esenlik S., et al., "Non-CE4: Geometrical partitioning for inter blocks", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-OQ489-V4, pp. 1-9.

Gao H., et al., "CE4-1: Geometric Inter Prediction with 64 Modes", JVET-Q0059-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.

Gao H., et al., "CE4-Related: Geometric Merge Mode (GEO) Simplifications", JVET-P0107-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-8.

Gao H., et al., "Simplified GEO without multiplication and minimum blending mask storage (harmonization of JVET-P0107, JVET-P0264 and JVET-P0304)", JVET-P0884-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Liao R-L., et al., "CE4-related: Simplification of Blending Weights and Motion Field Storage in Geometric Merge Mode", JVET-P0304-V1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.

Reuze K., et al., "CE4-related: Simplification of GEO Using Angles with Power-of Two Tangents", JVET P0264 v4, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.

Reuze K., et al., "Simplified GEO without Multiplication and Minimum Blending Mask Storage (Harmonization of JVET-P0107, JVET-P0264 and JVET-P0304)", JVET-P0885-v4, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-7.

Chen C-C., et al., "CE4: Summary Report on Inter Prediction", JVET-P0024-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-8.

Chen C-C., et al., "Description of Core Experiment 4 (CE4): Inter Prediction with Geometric Partitioning", JVET-P2024-V1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.

\* cited by examiner

| W | 8 | 8 | 8 | 8 | 16 | 16 | 16 | 16 | 32 | 32 | 32 | 32 | 64 | 64 | 64 | 64 | 64 |
|---|---|---|---|---|---|---|---|---|---|---|---|---|---|---|---|---|---|
| H | 8 | 16 | 32 | 64 | 8 | 16 | 32 | 64 | 8 | 16 | 32 | 64 | 8 | 16 | 32 | 64 | 128 |
| mode0 | 1 | 1 | 0 | 0 | 24 | 2 | 2 | 2 | 23 | 25 | 2 | 2 | 23 | 25 | 25 | 2 | 2 |
| mode1 | 2 | 2 | 1 | 1 | 23 | 1 | 1 | 0 | 24 | 14 | 1 | 1 | 24 | 64 | 23 | 1 | 48 |
| mode2 | 41 | 0 | 2 | 46 | 10 | 0 | 0 | 46 | 64 | 10 | 48 | 0 | 64 | 23 | 24 | 25 | 0 |
| mode3 | 0 | 7 | 46 | 2 | 18 | 25 | 48 | 1 | 25 | 24 | 0 | 48 | 25 | 24 | 10 | 48 | 46 |
| mode4 | 47 | 38 | 3 | 47 | 16 | 48 | 7 | 48 | 65 | 23 | 25 | 46 | 65 | 65 | 66 | 0 | 1 |
| mode5 | 10 | 39 | 47 | 48 | 25 | 41 | 38 | 3 | 18 | 41 | 14 | 47 | 66 | 14 | 2 | 23 | 54 |
| mode6 | 11 | 8 | 42 | 6 | 41 | 12 | 41 | 47 | 19 | 2 | 18 | 14 | 22 | 18 | 14 | 46 | 6 |
| mode7 | 12 | 41 | 4 | 5 | 14 | 14 | 10 | 42 | 20 | 18 | 41 | 54 | 21 | 22 | 6 | 47 | 3 |
| mode8 | 14 | 47 | 43 | 3 | 31 | 37 | 39 | 4 | 26 | 13 | 57 | 10 | 20 | 21 | 45 | 29 | 47 |
| mode9 | 33 | 10 | 6 | 44 | 15 | 47 | 54 | 43 | 22 | 6 | 37 | 7 | 19 | 19 | 41 | 14 | 4 |
| mode10 | 37 | 46 | 10 | 45 | 30 | 18 | 8 | 5 | 27 | 16 | 23 | 6 | 29 | 20 | 18 | 22 | 14 |
| mode11 | 16 | 40 | 5 | 42 | 2 | 35 | 46 | 51 | 14 | 37 | 33 | 3 | 18 | 27 | 13 | 18 | 10 |
| mode12 | 18 | 54 | 45 | 4 | 33 | 10 | 47 | 10 | 17 | 45 | 12 | 37 | 28 | 26 | 16 | 21 | 45 |
| mode13 | 15 | 9 | 44 | 50 | 12 | 57 | 45 | 44 | 21 | 33 | 29 | 45 | 26 | 10 | 64 | 24 | 9 |
| mode14 | 54 | 45 | 41 | 51 | 13 | 33 | 14 | 6 | 33 | 12 | 47 | 9 | 17 | 28 | 0 | 28 | 5 |
| mode15 | 34 | 6 | 48 | 43 | 11 | 11 | 40 | 45 | 16 | 40 | 22 | 8 | 27 | 41 | 33 | 33 | 42 |

FIG. 15A

| | | | | | | | | | | | | | | | | | |
|---|---|---|---|---|---|---|---|---|---|---|---|---|---|---|---|---|---|
| W | 64 | 64 | 64 | 64 | 64 | 32 | 32 | 32 | 32 | 16 | 16 | 16 | 16 | 8 | 8 | 8 | 8 |
| H | 128 | 64 | 32 | 16 | 8 | 64 | 32 | 16 | 8 | 64 | 32 | 16 | 8 | 64 | 32 | 16 | 8 |
| mode16 | 22 | 20 | 9 | 16 | 33 | 40 | 10 | 9 | 29 | 50 | 37 | 54 | 17 | 80 | 49 | 52 | 35 |
| mode17 | 37 | 57 | 12 | 29 | 68 | 38 | 11 | 17 | 15 | 54 | 6 | 13 | 37 | 81 | 9 | 14 | 31 |
| mode18 | 38 | 41 | 11 | 66 | 14 | 39 | 35 | 31 | 28 | 49 | 9 | 34 | 65 | 49 | 51 | 53 | 57 |
| mode19 | 7 | 60 | 40 | 17 | 61 | 42 | 13 | 11 | 66 | 14 | 53 | 22 | 34 | 10 | 7 | 37 | 17 |
| mode20 | 51 | 26 | 37 | 2 | 69 | 4 | 24 | 15 | 32 | 41 | 42 | 55 | 32 | 79 | 38 | 11 | 30 |
| mode21 | 8 | 27 | 17 | 15 | 62 | 11 | 60 | 39 | 30 | 9 | 3 | 29 | 40 | 41 | 50 | 12 | 23 |
| mode22 | 25 | 37 | 22 | 37 | 63 | 57 | 66 | 35 | 41 | 7 | 13 | 36 | 9 | 9 | 8 | 78 | 32 |
| mode23 | 44 | 10 | 65 | 13 | 67 | 5 | 54 | 1 | 31 | 40 | 11 | 75 | 6 | 38 | 40 | 3 | 24 |
| mode24 | 33 | 13 | 29 | 30 | 15 | 44 | 46 | 30 | 10 | 38 | 52 | 16 | 64 | 7 | 54 | 13 | 13 |
| mode25 | 29 | 15 | 4 | 6 | 16 | 33 | 36 | 0 | 2 | 8 | 51 | 15 | 35 | 54 | 39 | 76 | 55 |
| mode26 | 40 | 12 | 39 | 11 | 32 | 53 | 75 | 32 | 37 | 37 | 33 | 24 | 36 | 40 | 14 | 42 | 36 |
| mode27 | 36 | 30 | 15 | 40 | 41 | 25 | 15 | 64 | 13 | 80 | 18 | 73 | 45 | 39 | 79 | 51 | 40 |
| mode28 | 43 | 11 | 34 | 31 | 30 | 18 | 56 | 34 | 61 | 79 | 25 | 17 | 1 | 8 | 81 | 48 | 60 |
| mode29 | 18 | 16 | 43 | 12 | 37 | 51 | 30 | 36 | 36 | 81 | 4 | 32 | 39 | 37 | 78 | 34 | 75 |
| mode30 | 78 | 64 | 38 | 36 | 72 | 43 | 34 | 8 | 67 | 39 | 36 | 31 | 58 | 78 | 80 | 18 | 78 |
| mode31 | 81 | 19 | 8 | 39 | 31 | 13 | 16 | 65 | 11 | 78 | 43 | 30 | 22 | 14 | 37 | 36 | 38 |

FIG. 15B

GEOMETRIC PARTITION MODE WITH INCREASED EFFICIENCY

This application claims priority to U.S. Provisional Application No. 62/935,846, filed on Nov. 15, 2019, U.S. Provisional Application No. 62/950,856, filed on Dec. 19, 2019, and U.S. Provisional Application No. 62/958,566, filed on Jan. 8, 2020, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding using geometric partition mode (also referred to herein as GEO or GEO mode). More particularly, this disclosure describes techniques that may improve a displacement value associated with certain GEO angles such that the improved displacement value may reduce a size of residuals, techniques that may reduce an amount of GEO modes available in various situations, and techniques for reducing complexity of inter prediction in video coding by simplifying storage of GEO modes.

In one example, a method includes determining a first distance index associated with a first geometric partition mode (GEO) angle for a first prediction unit (PU) of the video data to be 4, determining, based on the first distance index, a first displacement value indicative of a distance from a center of the first PU to a GEO split such that a location of the GEO split is determined, and decoding the first PU based on the first GEO angle and the first displacement value, wherein the first displacement value is half of a displacement value associated with a distance index of 2.

In another example, a device includes a memory configured to store video data and one or more processors implemented in circuitry and coupled to the memory, the one or more processors being configured to determine a first distance index associated with a first geometric partition mode (GEO) angle for a first prediction unit (PU) of the video data to be 4, determine, based on the first distance index, a first displacement value indicative of a distance from a center of the first PU to a GEO split such that a location of the GEO split is determined, and decode the first PU based on the first GEO angle and the first displacement value, wherein the first displacement value is half of a displacement value associated with a distance index of 2.

In one example, a method includes determining a first geometric partition mode (GEO) angle for a first prediction unit (PU) of the video data to be 45 degrees, based on the first GEO angle being 45 degrees, determining a first distance index for the first PU to be 4, determining a first displacement value indicative of a distance from a center of the first PU to a GEO split, the first displacement value being associated with the first distance index, and encoding the first PU based on the first GEO angle and the first displacement value, wherein the first displacement value is half of a displacement value associated with a distance index of 2.

In another example, a device includes a memory configured to store video data and one or more processors implemented in circuitry and coupled to the memory, the one or more processors being configured to determine a first geometric partition mode (GEO) angle for a first prediction unit (PU) of the video data to be 45 degrees, based on the first GEO angle being 45 degrees, determine a first distance index for the first PU to be 4, determining a first displacement value indicative of a distance from a center of the first PU to a GEO split, the first displacement value being associated with the first distance index, and encode the first PU based on the first GEO angle and the first displacement value, wherein the first displacement value is half of a displacement value associated with a distance index of 2.

The details of one or more examples are set forth in the accompanying drawings and the description below. Other features, objects, and advantages will be apparent from the description, drawings, and claims.

BRIEF DESCRIPTION OF DRAWINGS

FIGS. 15A-15B are tables illustrating example GEO modes available based on PU size according to the techniques of this disclosure.

DETAILED DESCRIPTION

In some draft video standards for geometric partition mode (also referred to herein as GEO or GEO mode), there are displacement values associated with certain GEO angles that may result in larger residuals, worse quality decoded video, and/or worse rate-distortion values than are otherwise achievable. Additionally, in some draft video standards, there may be such a large number of available GEO modes that GEO mode tables may take up significant memory, searching to find the best GEO mode may take a significant amount of time and processing cycles, and signaling a selected GEO mode may take up a significant amount of overhead.

According to the techniques of this disclosure, displacement values associated with certain GEO angles may be improved to reduce the size of some residuals, improve the quality of some decoded video and/or improve some rate-distortion values such as those associated with the certain GEO angles. Additionally, according to the techniques of this disclosure, the number of GEO modes available to be used in various situations may be reduced. The reduction of the number of GEO modes available may decrease memory usage, processing time and cycles, and overhead associated with GEO mode.

Figure 1:
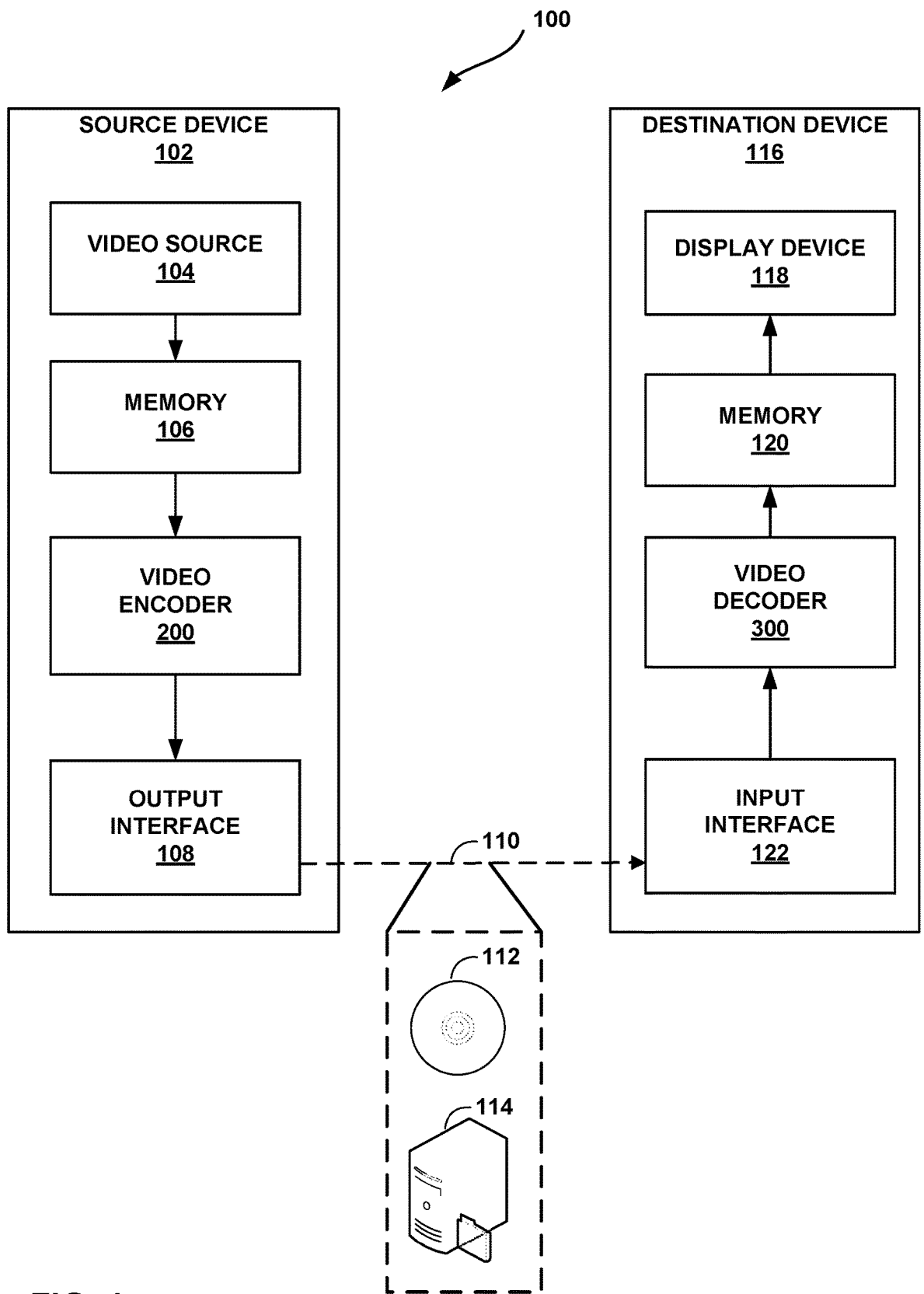
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, video encoding and decoding system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, mobile phones, mobile devices, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for video coding using geometric partition mode (GEO mode). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Video encoding and decoding system 100 as shown in FIG. 1 is merely one example. In general, any digital video encoding and/or decoding device may perform techniques for video coding using GEO mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, video encoding and decoding system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally, or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, $16^{th}$ Meeting: Geneva, CH, 1-11 Oct. 2019, JVET-P2001-v9 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors (MVs). Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more MVs that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode MVs using advanced MV prediction (AMVP) or merge mode. Video encoder 200 may use similar modes to encode MVs for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes determining a first distance index associated with a first geometric partition mode (GEO) angle for a first prediction unit (PU) of the video data to be 4, determining, based on the first distance index, a first displacement value indicative of a distance from a center of the first PU to a GEO split such that a location of the GEO split is determined, and decoding the first PU based on the first GEO angle and the first displacement value, wherein the first displacement value is half of a displacement value associated with a distance index of 2.

In accordance with techniques of this disclosure, a device includes a memory configured to store the video data, and one or more processors implemented in circuitry and coupled to the memory, the one or more processors being configured to determine a first distance index associated with a first geometric partition mode (GEO) angle for a first prediction unit (PU) of the video data to be 4, determine, based on the first distance index, a first displacement value indicative of a distance from a center of the first PU to a GEO split such that a location of the GEO split is determined, and decode the first PU based on the first GEO angle and the first displacement value, wherein the first displacement value is half of a displacement value associated with a distance index of 2.

In accordance with the techniques of this disclosure, a method includes determining a first geometric partition mode (GEO) angle for a first prediction unit (PU) of the video data to be 45 degrees, based on the first GEO angle being 45 degrees, determining a first distance index for the first PU to be 4, determining a first displacement value indicative of a distance from a center of the first PU to a GEO split, the first displacement value being associated with the first distance index, and encoding the first PU based on the first GEO angle and the first displacement value, wherein the first displacement value is half of a displacement value associated with a distance index of 2.

In accordance with techniques of this disclosure, a device includes a memory configured to store the video data, and one or more processors implemented in circuitry and coupled to the memory, the one or more processors being configured to determine a first geometric partition mode (GEO) angle for a first prediction unit (PU) of the video data to be 45 degrees, based on the first GEO angle being 45 degrees, determine a first distance index for the first PU to be 4, determining a first displacement value indicative of a distance from a center of the first PU to a GEO split, the first displacement value being associated with the first distance index, and encode the first PU based on the first GEO angle and the first displacement value, wherein the first displacement value is half of a displacement value associated with a distance index of 2.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
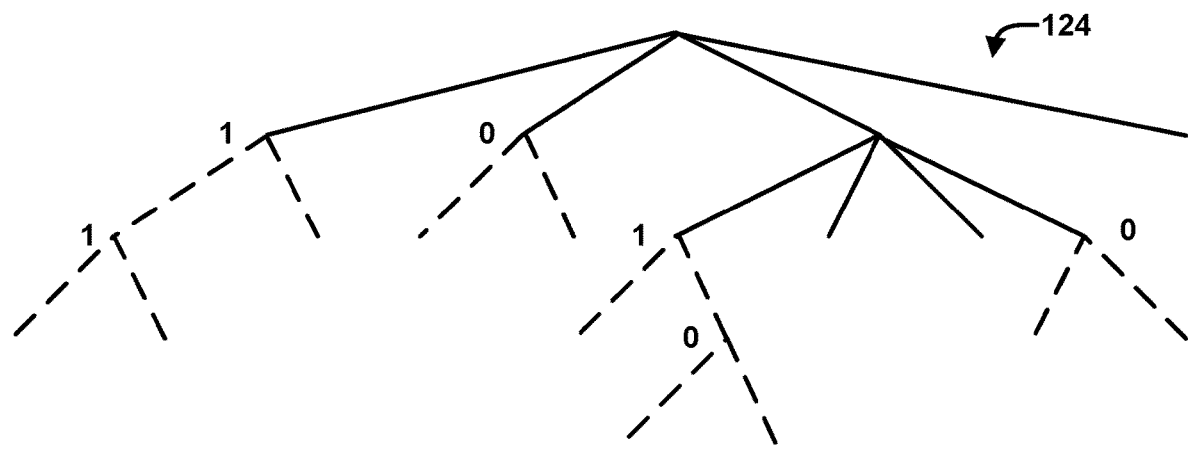
FIGS. 2A and 2B are conceptual diagrams illustrating an example quadtree binary tree (QTBT) structure, and a corresponding coding tree unit (CTU).
Figure 2B:
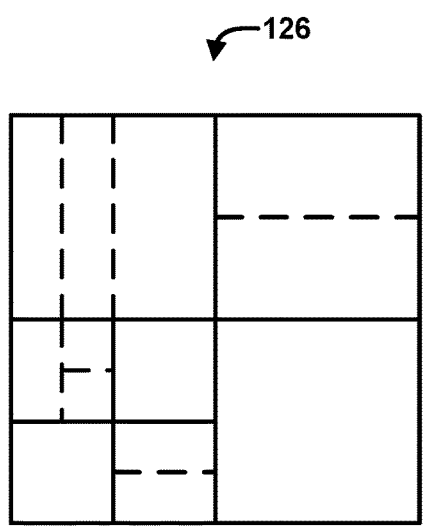

FIGS. 2A and 2B are conceptual diagrams illustrating an example quadtree binary tree (QTBT) structure 124, and a corresponding coding tree unit (CTU) 126. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 124 (i.e., the solid lines) and syntax elements (such as splitting information) for a prediction tree level of QTBT structure 124 (i.e., the dashed lines). Video encoder 200 may encode, and video decoder 300 may decode, video data, such as prediction and transform data, for CUs represented by terminal leaf nodes of QTBT structure 124.

In general, CTU 126 of FIG. 2B may be associated with parameters defining sizes of blocks corresponding to nodes of QTBT structure 124 at the first and second levels. These parameters may include a CTU size (representing a size of CTU 126 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 124 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 124 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
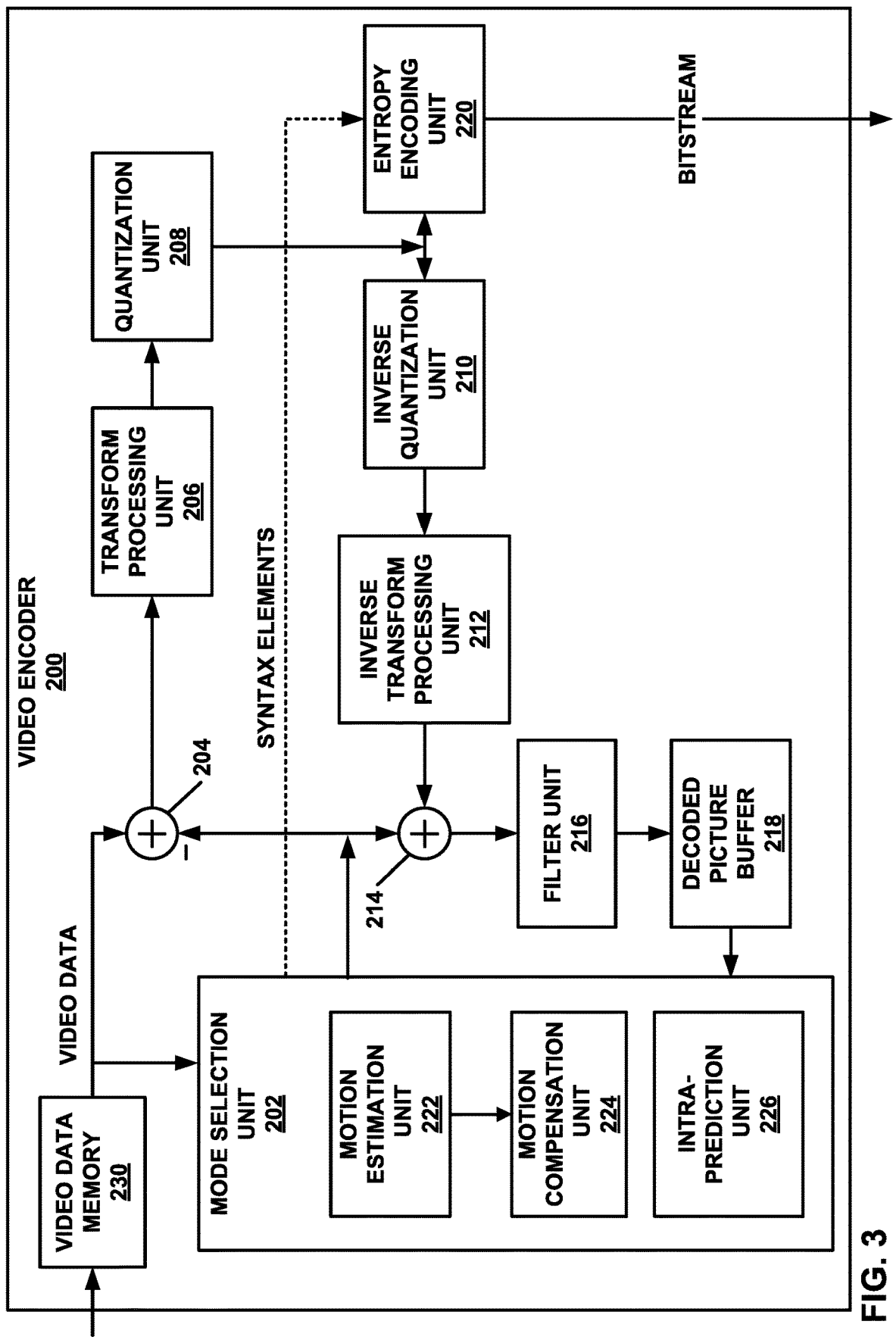
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. For example, some encoding parameters may include GEO mode and various angles of GEO mode. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more MVs that defines the positions of the reference blocks in the reference pictures relative to the position of the current block in a current picture. Motion estimation unit 222 may then provide the MVs to motion compensation unit 224. For example, for uni-directional inter-prediction, motion estimation unit 222 may provide a single MV, whereas for bi-directional inter-prediction, motion estimation unit 222 may provide two MVs. Motion compensation unit 224 may then generate a prediction block using the MVs. For example, motion compensation unit 224 may retrieve data of the reference block using the MV. As another example, if the MV has fractional sample precision, motion compensation unit 224 may interpolate values for the prediction block according to one or more interpolation filters. Moreover, for bi-directional inter-prediction, motion compensation unit 224 may retrieve data for two reference blocks identified by respective MVs and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify an MV and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store the video data, and one or more processors implemented in circuitry and coupled to the memory, the one or more processors being configured to determine a first geometric partition mode (GEO) angle for a first prediction unit (PU) of the video data to be 45 degrees, based on the first GEO angle being 45 degrees, determine a first distance index for the first PU to be 4, determining a first displacement value indicative of a distance from a center of the first PU to a GEO split, the first displacement value being associated with the first distance index, and encode the first PU based on the first GEO angle and the first displacement value, wherein the first displacement value is half of a displacement value associated with a distance index of 2.

Figure 4:
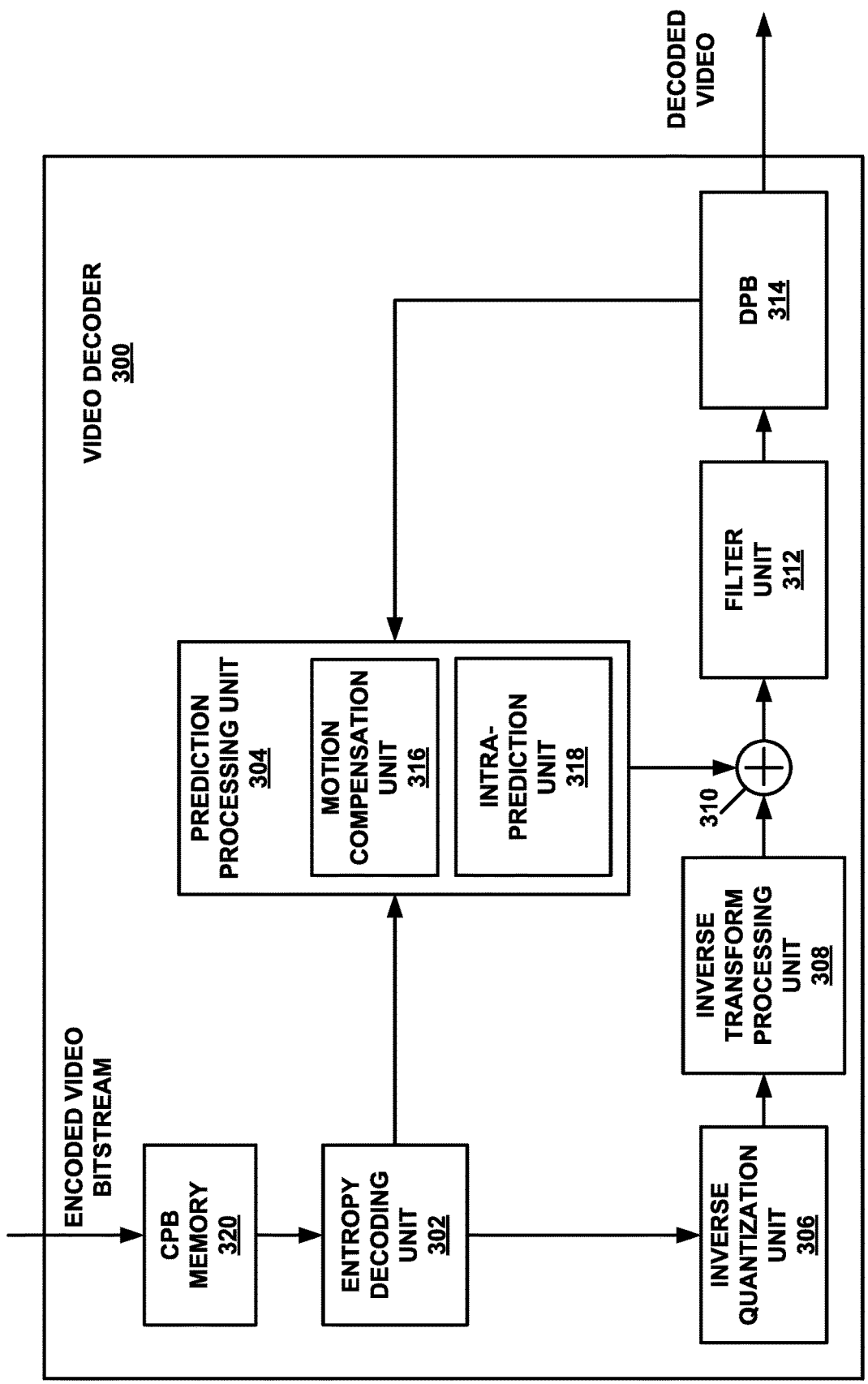
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as an MV identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store the video data and one or more processors implemented in circuitry and coupled to the memory, the one or more processors being configured to determine a first distance index associated with a first geometric partition mode (GEO) angle for a first prediction unit (PU) of the video data to be 4, determine, based on the first distance index, a first displacement value indicative of a distance from a center of the first PU to a GEO split such that a location of the GEO split is determined, and decode the first PU based on the first GEO angle and the first displacement value, wherein the first displacement value is half of a displacement value associated with a distance index of 2.

In this section of this disclosure video coding standards, especially GEO storage-related techniques of previous standards are described. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

Figure 5:
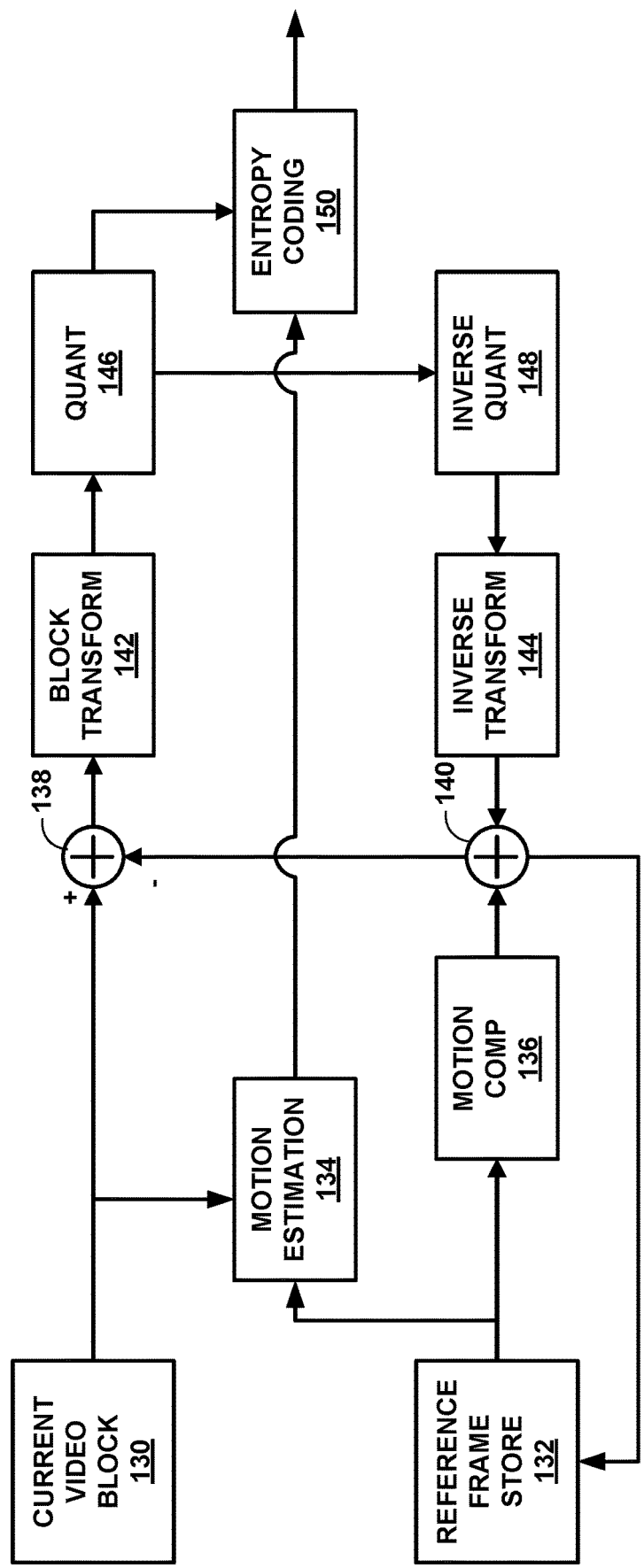
FIG. 5 is a block diagram illustrating flow of a video encoder, such as that of FIG. 3, that may perform techniques of this disclosure.

FIG. 5 is a block diagram illustrating flow of a video encoder, such as that of FIG. 3, that may perform techniques of this disclosure. Video encoders, such as video encoder 200 that use video compression technologies, perform spatial and temporal prediction to reduce or remove the redundancy inherent in input video signals. In the example of FIG. 5, a current video block 130 is provided to motion estimation unit 134 and residual generation unit 138. Residual generation unit 138 may generate a residual block by subtracting a prediction block from the current block. Block transform unit 142 may perform a transform operation on the residual block to generate transform coefficients. Quantization unit 146 may quantize the transform coefficients. Entropy coding unit 150 may entropy code the quantized transform coefficients and MVs from motion estimation unit 134 and output encoded quantized transform coefficients and MV information in a bitstream. Inverse quantization unit 148 may inverse quantize the quantized transform. Inverse transform unit 144 may inverse transform the transform coefficients to reconstruct the residual data. Reference frame store 132 may provide a reference frame to motion estimation unit 134 and motion compensation unit 136. Motion estimation unit 134 may generate MVs based on the reference frame. Motion compensation unit 136 may perform motion compensation. Reconstruction unit 140 may reconstruct a block of video data.

In order to reduce temporal redundancy (that is, similarities between video signals in neighboring frames), motion estimation is carried out on a current block of video data to track the movement of video objects. Motion estimation may be performed on blocks of variable sizes. The object displacement as the outcome of motion estimation is commonly known as a motion vector (MV). MVs may have half-pixel, quarter-pixel, $\frac{1}{16}$th-pixel precisions (or finer precisions). This range of precisions allows the video coder, such as video encoder 200, to track the motion field in higher precision than integer-pixel locations and hence obtain a better prediction block. When MVs with fractional pixel values are used, video encoder 200 may carry out interpolation operations.

After motion estimation is performed, the best MV may be determined using a certain rate-distortion model. For example, video encoder 200 may select the best MV using a rate-distortion model. Then, video encoder 200 may form the prediction video block by motion compensation using the selected best MV. Video encoder 200 may form the residual video block by subtracting the prediction video block from the original video block. Video encoder 200 may apply a transform to the residual block.

Video encoder 200 may then quantize and entropy-code the resulting transform coefficients to further reduce bit rate. Note that some video coding systems, such as those implementing the H.264/AVC or HEVC standard, also allow spatial prediction for intra coded blocks, which is not depicted in FIG. 5 (but which is depicted in FIGS. 3 and 4).

As introduced in Chen et al, "Algorithm description for Versatile Video Coding and Test Model 5 (VTM5), Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1002, the triangle partition mode (TPM) may be applied only to CUs coded in skip or merge mode, but not in merge with MV difference (MMVD) or combined intra/inter prediction (CIIP) mode. For a CU satisfying those conditions, a flag is signaled by the video encoder, such as video encoder 200, to indicate whether the TPM is applied or not.

Figure 6A:
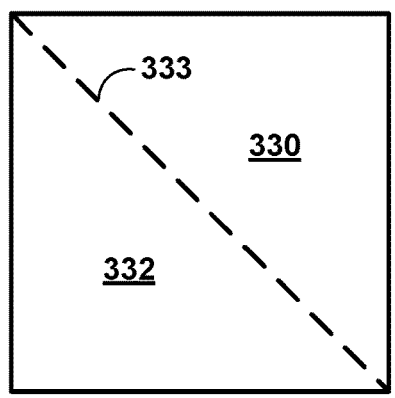
FIGS. 6A and 6B are conceptual diagrams illustrating examples of triangle partitioning.
Figure 6B:
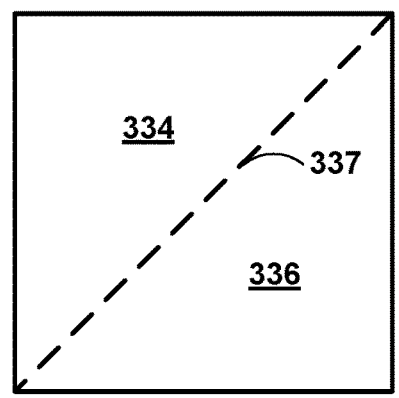

FIGS. 6A and 6B are conceptual diagrams illustrating examples of TPM partitioning. When using TPM, video encoder 200 or video decoder 300 may split the CU evenly into two triangle-shaped partitions using either a diagonal split or an anti-diagonal split. In the example of FIG. 6A, video encoder 200 or video decoder 300 may split the CU evenly into two triangle-shaped partitions, partition 330 and partition 332 using the diagonal split 333. In the example of FIG. 6B, video encoder 200 or video decoder 300 may split the CU evenly into two triangle-shaped partitions, partition 334 and partition 336 using the anti-diagonal split 337. (It is noted that partition 330 and partition 332 are the triangle blocks sitting respectively on the upper-right corner and lower-left corner when CUs are partitioned from top-left to lower-right (that is 45° split), while partition 334 and partition 336 are the triangle blocks sitting respectively on the upper-left corner and lower-right corner when CUs are partitioned from top-right to lower-left (that is 135° split). In TPM, video encoder 200 or video decoder 300 may inter-predict each triangle partition in the CU using the partition's own motion. Only uni-prediction is allowed for each partition. That is, each partition has one MV and one reference index. The uni-prediction motion constraint may be applied to ensure that, just as with conventional bi-prediction, only two motion compensated predictions are needed for each CU.

The uni-prediction motion for each partition is derived from a uni-prediction candidate list constructed as discussed below. If the CU-level flag indicates that the current CU is coded using the TPM, then video encoder 200 further signals a flag indicating the direction of the triangle partition (diagonal or anti-diagonal), and two merge indices (one for each partition). After predicting each of the triangle partitions, video encoder 200 or video decoder 300 may adjust the sample values along the diagonal or anti-diagonal edge using a blending processing with adaptive weights. This is the prediction signal for the whole CU, and video encoder 200 or video decoder 300 may apply a transform and quantization process to the whole CU as in other prediction modes. Video encoder 200 or video decoder 300 may store the motion field of a CU predicted using the TPM in 4×4 units as is discussed further below.

Figure 7:
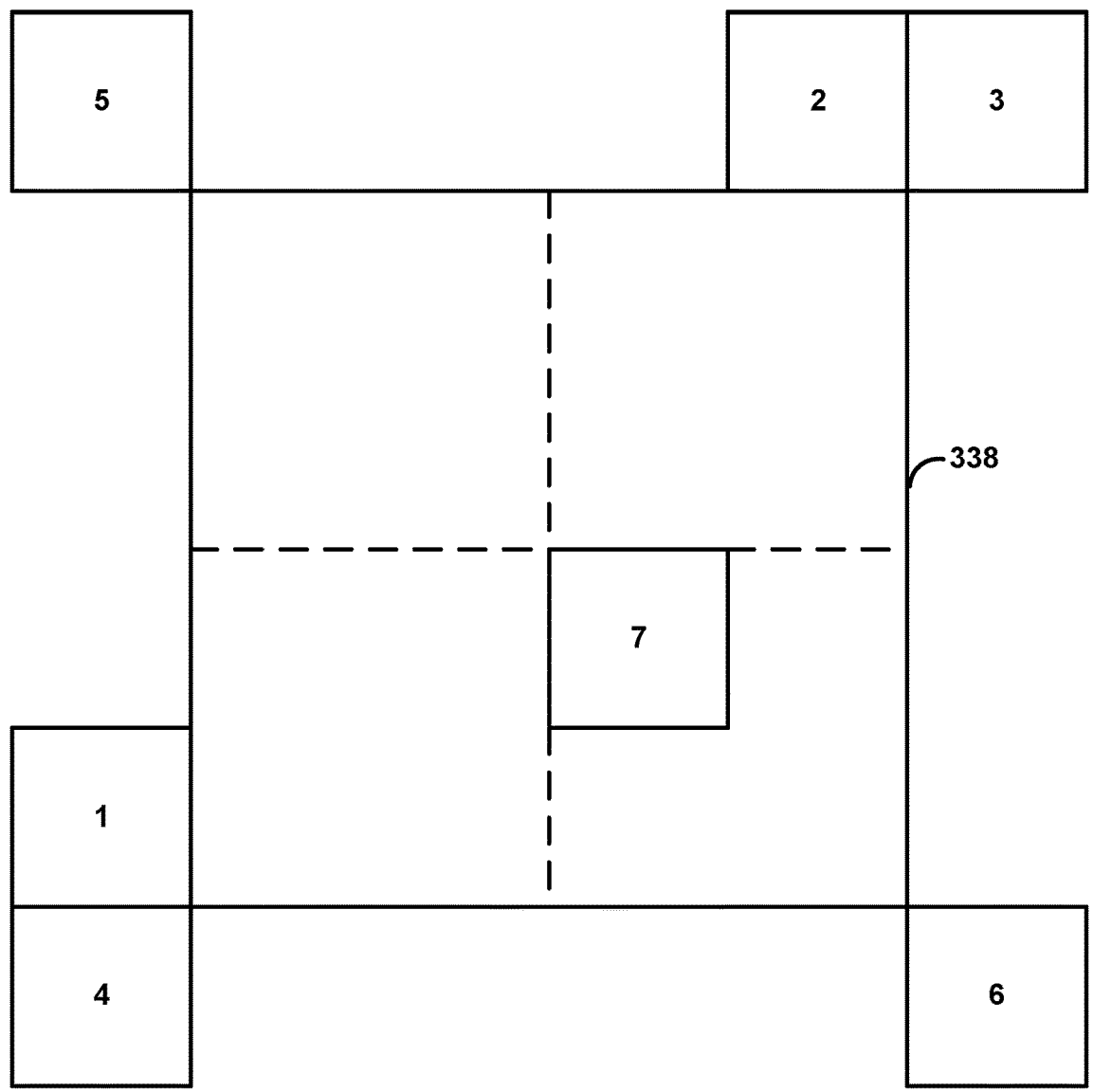
FIG. 7 is a conceptual diagram illustrating spatial and temporal neighboring blocks used to construct a uni-prediction candidate list.

FIG. 7 is a conceptual diagram illustrating spatial and temporal neighboring blocks used to construct a uni-prediction candidate list. Video encoder 200 or video decoder 300 may create a uni-prediction candidate list consisting of five uni-prediction MV candidates. The uni-prediction candidate list is derived from seven neighboring blocks including five spatial neighboring blocks (labeled 1 to 5 in FIG. 7) and two temporal co-located blocks (labeled 6 to 7 in FIG. 7). The MVs of the seven neighboring blocks of current block 338 are determined and put into the uni-prediction candidate list according to the following order: first, the MVs of the uni-predicted neighboring blocks; then, for the bi-predicted neighboring blocks, the L0 MVs (that is, the L0 MV part of the bi-prediction MVs), the L1 MVs (that is, the L1 MV part of the bi-prediction MVs), and averaged MVs of the L0 and L1 MVs of the bi-prediction MVs. If the number of candidates is less than five, zero MV candidate(s) are added to the end of the list.

Figure 8:
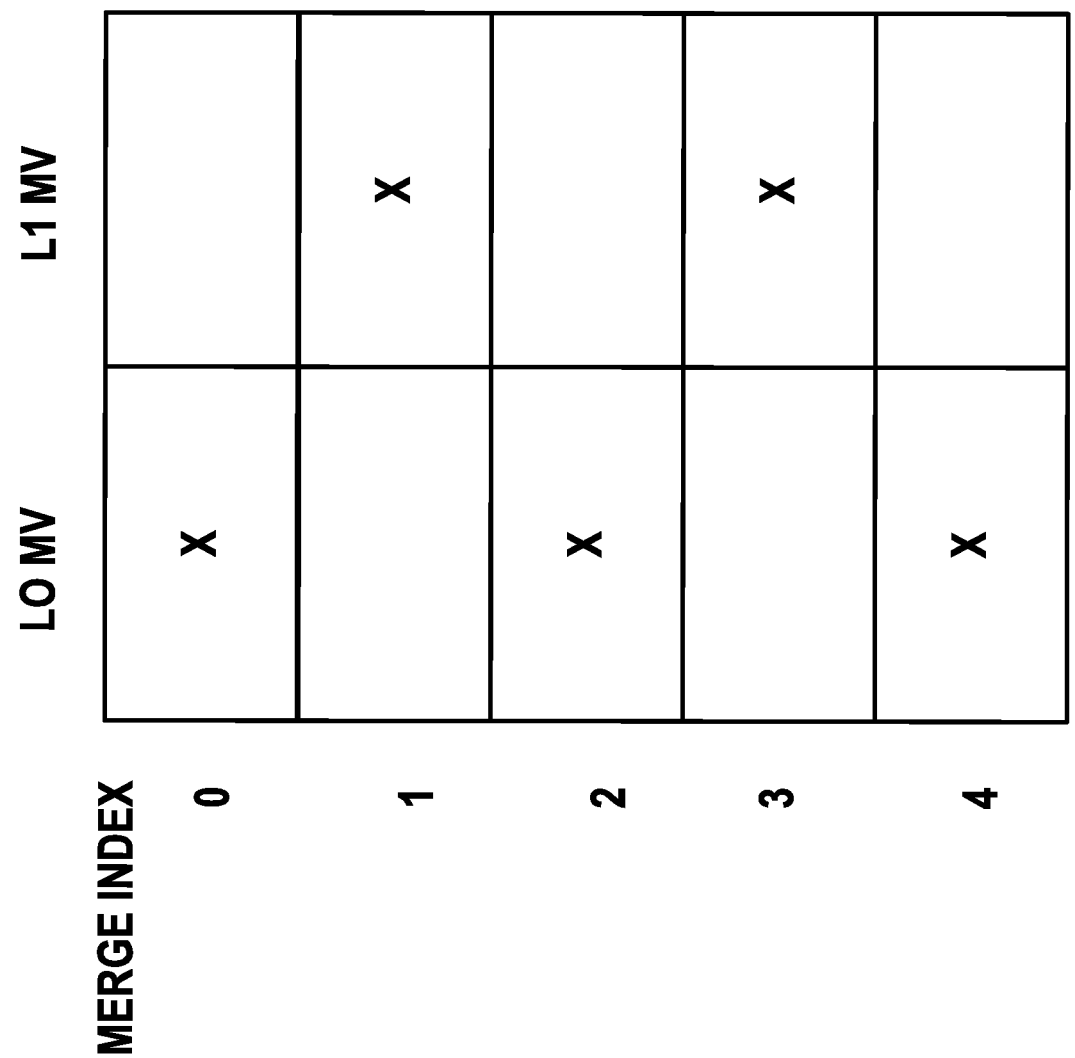
FIG. 8 is a conceptual diagram illustrating uni-prediction motion vector (MV) selection for triangle partition mode (TPM).

FIG. 8 is a conceptual diagram illustrating uni-prediction MV selection for TPM. Given a merge candidate index, video decoder 300 may derive the uni-prediction MV from the merge candidate list. For a candidate in the merge list, the candidate's LX MV (with X equal to the parity of the merge candidate index value, e.g., LX is list0 or list1) is used as the uni-prediction MV for TPM. These MVs are marked with "X" in FIG. 8. In case a corresponding LX MV does not exist, the L(1−X) MV of the same candidate in the extended merge prediction candidate list is used as the uni-prediction MV for TPM. For example, supposing the merge list is composed of 5 sets of bi-prediction motions, the TPM candidate list is includes, from the first to the last, L0/L1/L0/L1/L0 MV of 0th/1st/2nd/3rd/4th merge candidate. Then in the TPM mode, video encoder 200 may signal two different merge indices, one for a triangle partition, and one to indicate the use of candidates in the TPM candidate list.

Figure 9:
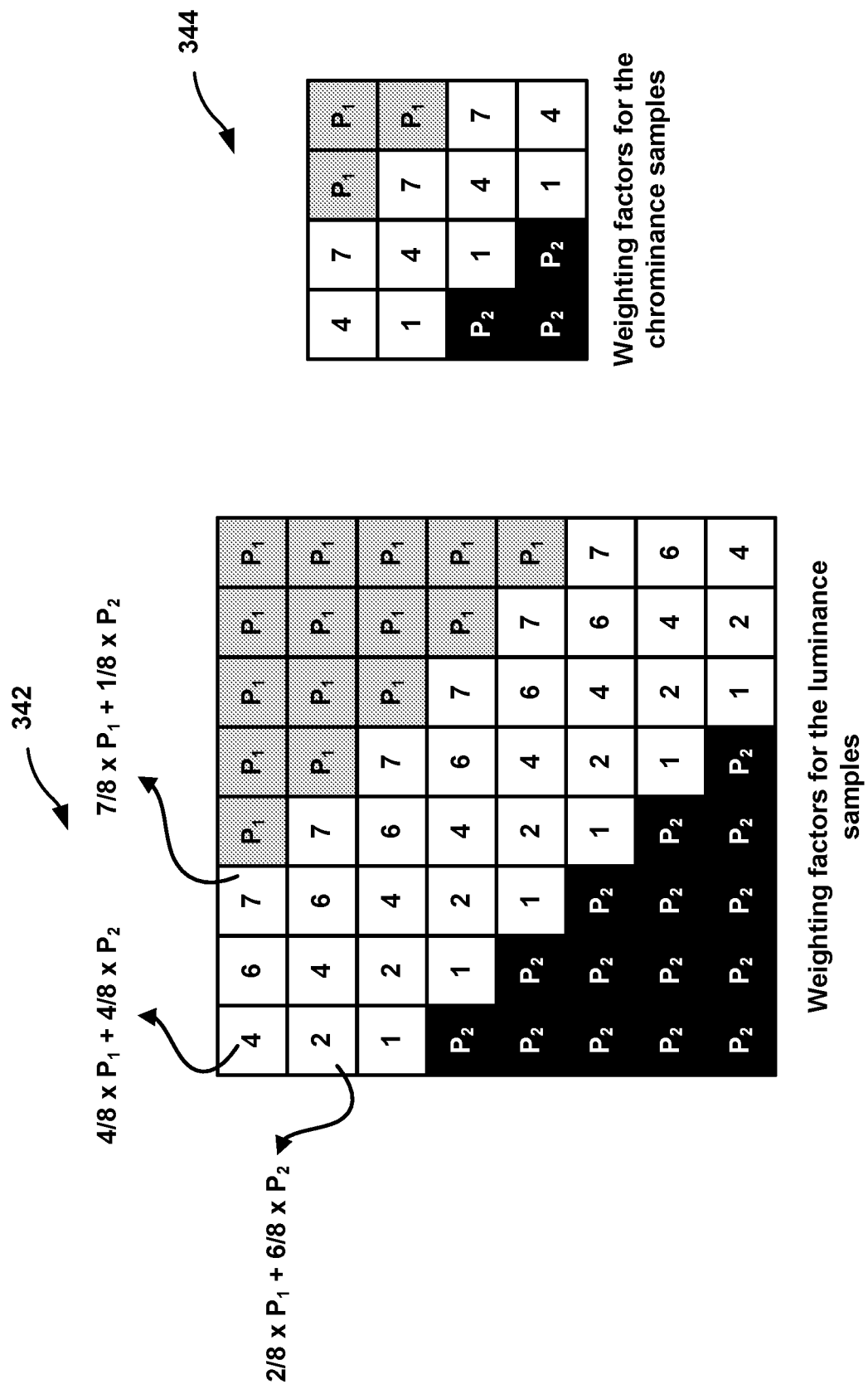
FIG. 9 is a conceptual diagram illustrating example weights used in a TPM blending process.

FIG. 9 is a conceptual diagram illustrating example weights used in a TPM blending process. After predicting each triangle partition using the partition's own motion, video encoder 200 or video decoder 300 may apply blending to the two prediction signals to derive samples around the diagonal (e.g., diagonal split 333) or anti-diagonal (e.g., anti-diagonal split 337) edge. Video encoder 200 or video decoder 300 may use the following weights in the blending process:

⅞, ⁶⁄₈, ⅝, ⁴⁄₈, ⅜, ²⁄₈, ⅛} for luma 342 and {⅝, ⁴⁄₈, ⅔⁄₈} for chroma 344, as shown in FIG. 9.

As mentioned above, the MVs of a CU coded in TPM are stored in 4×4 units. Depending on the position of each 4×4 unit, either uni-prediction or bi-prediction MVs are stored. For example, Mv1 and Mv2 may refer to the uni-prediction MVs for partition 1 and partition 2, respectively, as used herein.

If a 4×4 unit is located in the non-weighted area shown in the example of FIG. 8, video encoder 200 or video decoder 300 may store either Mv1 or Mv2 for that 4×4 unit. Otherwise, if the 4×4 unit is located in the weighted area, video encoder 200 or video decoder 300 may store a bi-prediction MV. Video encoder 200 or video decoder 300 may derive the bi-prediction MV from Mv1 and Mv2 according to the following process: If Mv1 and Mv2 are from different reference picture lists (e.g., one is from L0 and the other is from L1), then Mv1 and Mv2 are simply combined to form the bi-prediction MV. Otherwise, if Mv1 and Mv2 are from the same reference picture list, only Mv2 is stored.

Geometric partitioning was introduced in Esenlik, et al. "Non-CE4: Geometrical partitioning for inter blocks," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O0489 (hereinafter "JVET-O0489") as a proposed extension to the non-rectangular partitioning introduced by TPM. As introduced in JVET-O0489, the geometric partition mode (GEO) may be applied only to CUs coded in skip or merge mode, but not in MMVD or CIIP mode. For a CU satisfying those conditions, a flag is signaled by a video encoder, such as video encoder 200, to indicate whether GEO is applied or not.

Figure 10:
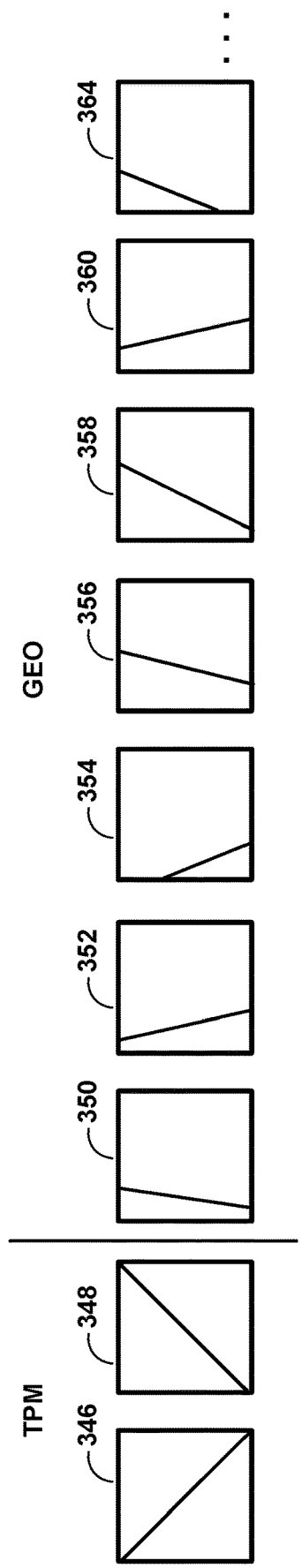
FIG. 10 is a conceptual diagram illustrating example shapes for TPM and for GEO mode.

FIG. 10 is a conceptual diagram illustrating example shapes for TPM and for GEO mode. In TPM, there are two partition possibilities for a block, as shown in block 346 with a diagonal split and block 348 with an anti-diagonal split, and also shown in FIGS. 6A and 6B. However, with the GEO mode, the overall number of partition possibilities is 140. Several examples of GEO partitioned blocks are shown as blocks 350-364. As can be seen, in GEO mode, a partition does not need to start in a corner of a block.

Figure 11:
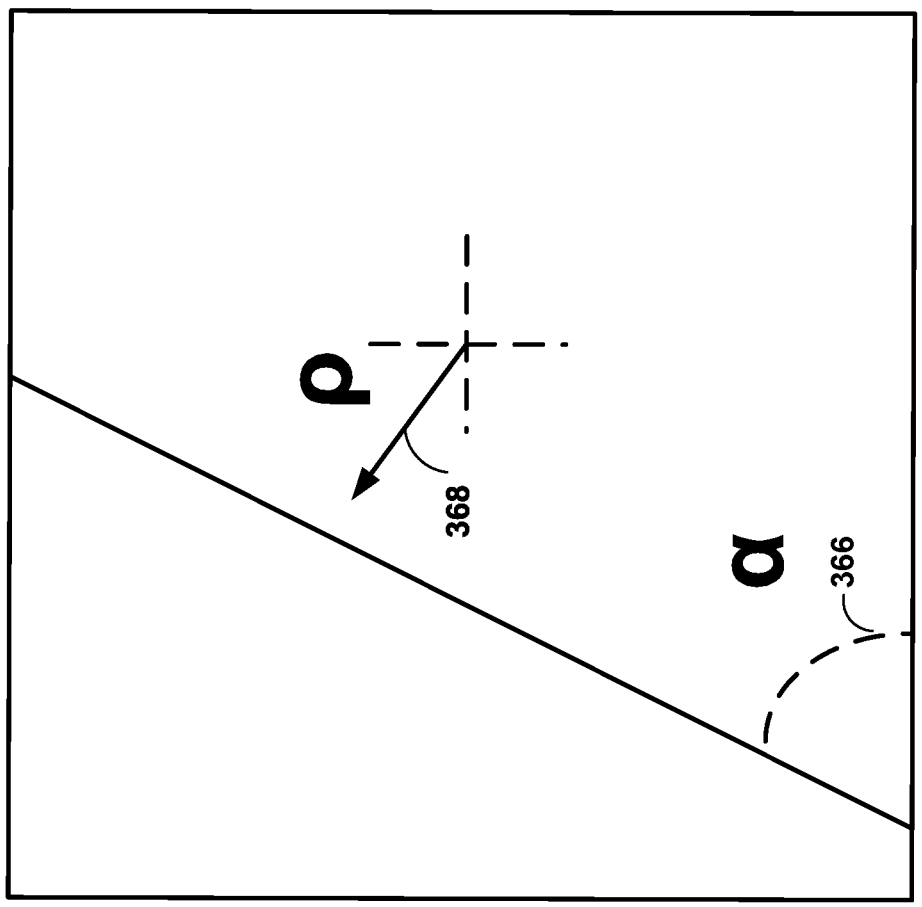
FIG. 11 is a conceptual diagram illustrating example signaling for GEO mode partitioning.

FIG. 11 is a conceptual diagram illustrating example signaling for GEO mode partitioning. The number of partition possibilities of 140 was believed by many to be optimal from viewpoint of flexibility versus signaling. Because GEO mode has 140 possible partitions compared with 2 for TPM, GEO mode requires additional signaling. For example, video encoder 200 may signal the angle, alpha 366, and separation line displacement relatively to the center of the block, rho 368. alpha 366 represents a quantized angle between 0 and 360 degrees, with 11.25 degrees of separation and rho 368 represents a distance with any of 5 different values. The values alpha and rho pairs may be stored in a table of size 140×(3+5)/8=140 bytes. For example, video encoder 200 may signal alpha and rho to video decoder 300 and video decoder may parse alpha and rho based on the signaling.

Similarly to TPM, GEO partitioning for inter is allowed for uni-predicted blocks not smaller than 8×8 in order to have the same memory bandwidth as used with bi-predicted blocks, for example at video decoder 300. MV prediction for GEO partitioning is aligned with TPM. Similar to TPM, video encoder 200 or video decoder 300 may apply blending between 2 predictions on the inner boundary (e.g., the boundary of the split).

According to JVET-O0489, a video encoder, such as video encoder 200, may signal the GEO mode as an additional merge mode as set forth in Table 1.

TABLE 1

Syntax elements introduced by JVET-O0489 proposal

```
if (cbWidth >=8 && cbHeight >=8 ){
    geo_flag[ x0 ][ y0 ]
}
if (geo_flag[ x0 ][ y0 ]) {
    geo_partition_idx[ x0 ][ y0 ]
```

TABLE 1-continued

Syntax elements introduced by JVET-O0489 proposal

```
    geo_merge_idx0[ x0 ][ y0 ]
    geo_merge_idx1[ x0 ][ y0 ]
}
```

The geo_merge_idx0 and geo_merge_idx1 are coded using same CABAC contexts and binarization as TPM merge indices. The geo_partition_idx indicates the partition mode (e.g., out of the 140 possibilities) and may be coded using truncated binary binarization and bypass coding.

When GEO mode is not selected, video encoder 200 may select the TPM. The partitions of the GEO mode may not include partitions that may be obtained by TPM by way of binary splitting. The proposed signaling scheme of JVET-O0489 is similar to intra mode signaling in that the TPM partitions correspond to most probable partitions and GEO modes correspond to remaining partitions.

The geo_partition_idx may be used as an index to the lookup table that stores the alpha and rho pairs. As described above, 140 bytes are necessary to store this table.

As in the case of TPM, video encoder 200 or video decoder 300 may obtain the final prediction of the coding block by weighted averaging of a first uni-prediction and a second uni-prediction according to sample weights.

sampleWeight$L$[$x$][$y$]=GeoFilter[distScaled] if distFromLine<=0 sampleWeight$L$[$x$][$y$]=8−GeoFilter[distScaled] if distFromLine>0

Where sample weights are implemented as a lookup table as in Table 2 as follows:

TABLE 2

| Blender Filter Weights | | | | | | | | | | | | | | | |
|---|---|---|---|---|---|---|---|---|---|---|---|---|---|---|---|
| distScaled | 0 | 1 | 2 | 3 | 4 | 5 | 6 | 7 | 8 | 9 | 10 | 11 | 12 | 13 | 14 |
| GeoFilter[distScaled] | 4 | 4 | 5 | 5 | 5 | 5 | 6 | 6 | 6 | 6 | 7 | 7 | 7 | 7 | 8 |

The distScaled is a quantized level of the L2 distance (or displacement) measured from a certain pixel position inside a block to the edge of geometric partitions. Video encoder 200 or video decoder 300 may compute this quantized level in a two-step manner as follows: (a) compute the maximum displacement $\overline{CD}$ and (b) quantize $\overline{CD}$ to several levels.

Figure 12B:
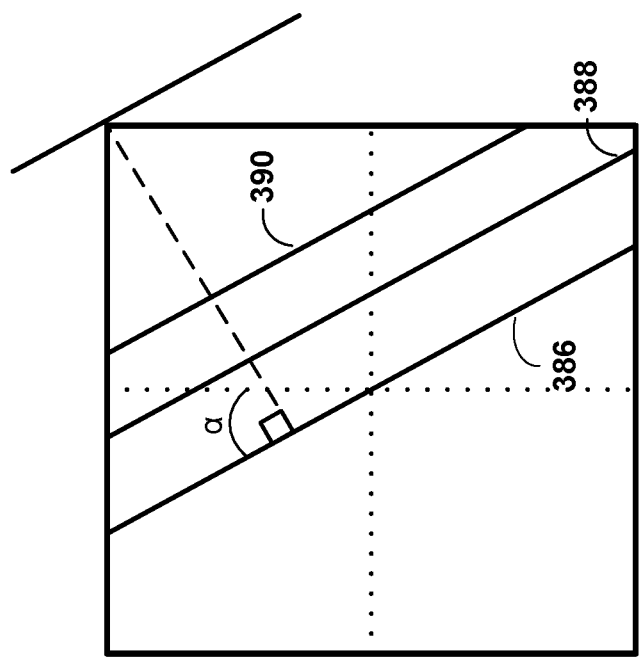
FIGS. 12A and 12B are conceptual diagrams illustrating example geometric relationships among partitioning edges, displacements and angles.
Figure 12A:
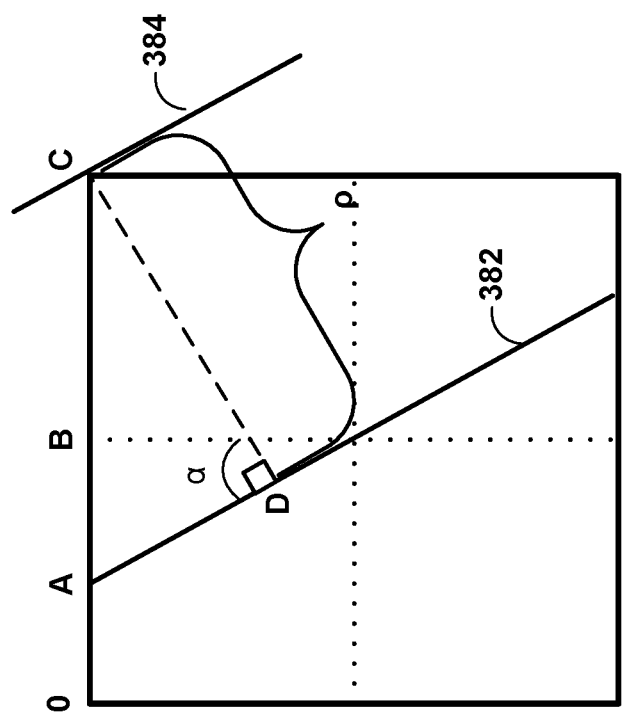

FIGS. 12A and 12B are conceptual diagrams illustrating example geometric relationships among partitioning edges, displacements and angles. FIG. 12A depicts a GEO mode edge 382 with a displacement of 0 and GEO mode edge 384 with a displacement of ρ. As depicted in FIG. 12A, given a W×H CU and an angle α, $\overline{CD}$ can be computed as follows:

$$\overline{CD} = \overline{AC} * \sin(\alpha) \quad (1)$$

$$= ((W/2) + (H/2) * \tan(\alpha)) * \cos(\alpha) \quad (2)$$

$$= (W/2) * \cos(\alpha) + (H/2) * \sin(\alpha) \quad (3)$$

Then, before $\overline{CD}$ is quantized into levels, $\overline{CD}$ is adjusted with an adjustment offset, o (e.g. 0 or 1), to prevent generating an extremely small geometric partition of certain angles and CUs, and thus the quantization step size can be computed as follows: step size=($\overline{CD}$−o)/N, where N (e.g. 5 or 4) is the number of quantization levels. As illustrated in FIG. 12B, with a given quantization level and an angle α, the position of each edge (e.g., edge 386, edge 388, edge 390, and so forth with a quantization level 0, 1, 2, . . . , respectively) can be defined.

Figure 13:
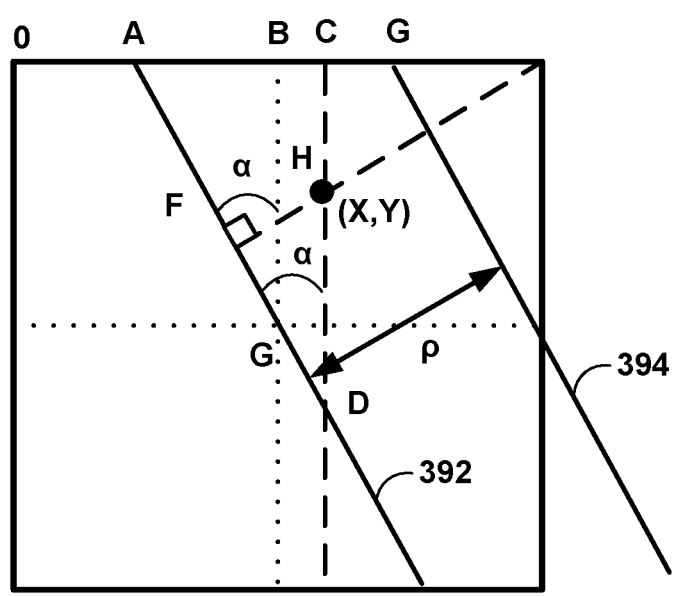
FIG. 13 is a conceptual diagram illustrating an example projection of a point E at (x, y) onto an edge En.

FIG. 13 is a conceptual diagram illustrating an example projection of a point at (x, y) onto an edge 394. Then, when given an edge, the projection distance from a random pixel inside a CU can be defined. For example, as shown in FIG. 13, a pixel H is located at (x, y) and the given edge is edge 394 where edge 394 is an edge departing from the edge 392 with a displacement (e.g., $\overline{FG}$ or ρ) of n*step size. The distance (e.g., $\overline{GH}$) from H to En can be computed as follows in Table 3:

TABLE 3

| $\overline{GH}$ | $=\overline{FH} - \overline{FG}$ |
|---|---|
|  | $=\overline{DH} * \sin(\alpha) - \rho$ |
|  | $=((x - W/2) * \cot(\alpha) + (H/2 - y)) * \sin(\alpha) - \rho$ |
|  | $=(x - W/2) * \cos(\alpha) + (H/2 - y) * \sin(\alpha) - \rho$. |

For example, video encoder 200 may compute the distance $\overline{GH}$. In the interest of floating-point number precision, the maximum distance between a pixel inside a CU to an edge is quantized (with a pre-defined step size of 5/36) into intervals with an index assigned. Here, the absolute value of the assigned index is distScaled.

The aforementioned process can be implemented in a look-up table. The number of operations necessary for the calculation of the sample weight is on the order of 1 addition operation per sample, which has similar computational complexity as TPM. In more detail, for each sample, video encoder 200 or video decoder 300 may calculate distScaled according to the following two equations:

$$\text{distFromLine} = ((x<<1)+1)*\text{Dis}[\text{displacementX}] + ((y<<1)+1)*\text{Dis}[\text{displacementY}] - \text{rho}$$

$$\text{distScaled} = \min((\text{abs}(\text{distFromLine})+8)>>4, 14)$$

Where the variable rho, displacementX and displacementY are calculated once per coding block, Dis[ ] is a lookup table with 32 entries (e.g., 8 bits of resolution) that store cosine values. distFromLine can be calculated by incrementing distFromLine for each sample with a value of 2*Dis[displacementX] in a sample row and with a value of 2*Dis[displacementX] from one sample row to the next. Therefore, slightly more than 1 addition per sample are required to obtain distFromLine value. Additionally, minimum, absolute value, and downshift operations may be performed, which may not introduce any considerable complexity.

Operations of GEO may be implemented using integer arithmetic. For example, the computational complexity of GEO may be very similar to that of TPM.

Video encoder 200 or video decoder 300 may subsample the sample weights calculated for the luma samples and used the subsamples for chroma blending without any computation. The chroma sample weight at coordinate (x,y) may be set equal to the luma sample weight at coordinate (2x,2y) with respect to the top-left sample of the luma block.

Video encoder 200 or video decoder 300 may sum up luma sample weights (which may be calculated as discussed above) at the four corners of a 4×4 motion storage unit. Video encoder 200 or video decoder 300 may compare the sum with 2 thresholds to determine whether one of two uni-prediction motion information or bi-prediction motion information is stored. The bi-prediction motion information may be derived using the same process as for TPM.

During the 16$^{th}$ JVET meeting, in Geneva, CH, three different contributions were proposed to simplify the GEO mode as originally proposed in JVET-O0489. Those three contributions, Gao, et al. "CE4-Related: Geometric Merge Mode (GEO) Simplifications," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P0107 (hereinafter "JVET-P0107"); Reuze, et al. "CE4-Related: Simplification of GEO using angles with power-of-two tangents," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P0264 (hereinafter "JVET-P0264"); and Liao, et al. "CE4-Related: Simplification of blending weights and motion field storage in geometric merge mode," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P0304 (hereinafter "JVET-P0304"); were then combined in the joint proposals Gao, et al. "Simplified GEO without multiplication and minimum blending mask storage (harmonization of JVET-P0107, JVET-P0264 and JVET-P0304)," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P0884 (hereinafter "JVET-P0884") and Reuze, et al. "Simplified GEO without multiplication and minimum blending mask storage (harmonization of JVET-P0107, JVET-P0264 and JVET-P0304)," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P0885 (hereinafter "JVET-P0885") (which may be identical). This contribution (JVET-P0884/JVET-P0885) is the version of GEO that was tested in the Core Experiment and that was reviewed during the 17$^{th}$ JVET meeting in Brussels, BE in January 2020.

In JVET-P0264, the angles in GEO are replaced with angles having a tangent with a power of 2. Since the tangent of the proposed angles is a power-of-2 number, most of multiplications can be replaced by bit-shifting. Besides, the weight values for these angles may be implemented by repeating row-by-row or column-by-column with a phase shift. With the proposed angles, one row or column is needed to store per block size and per partition mode.

Figure 14A:
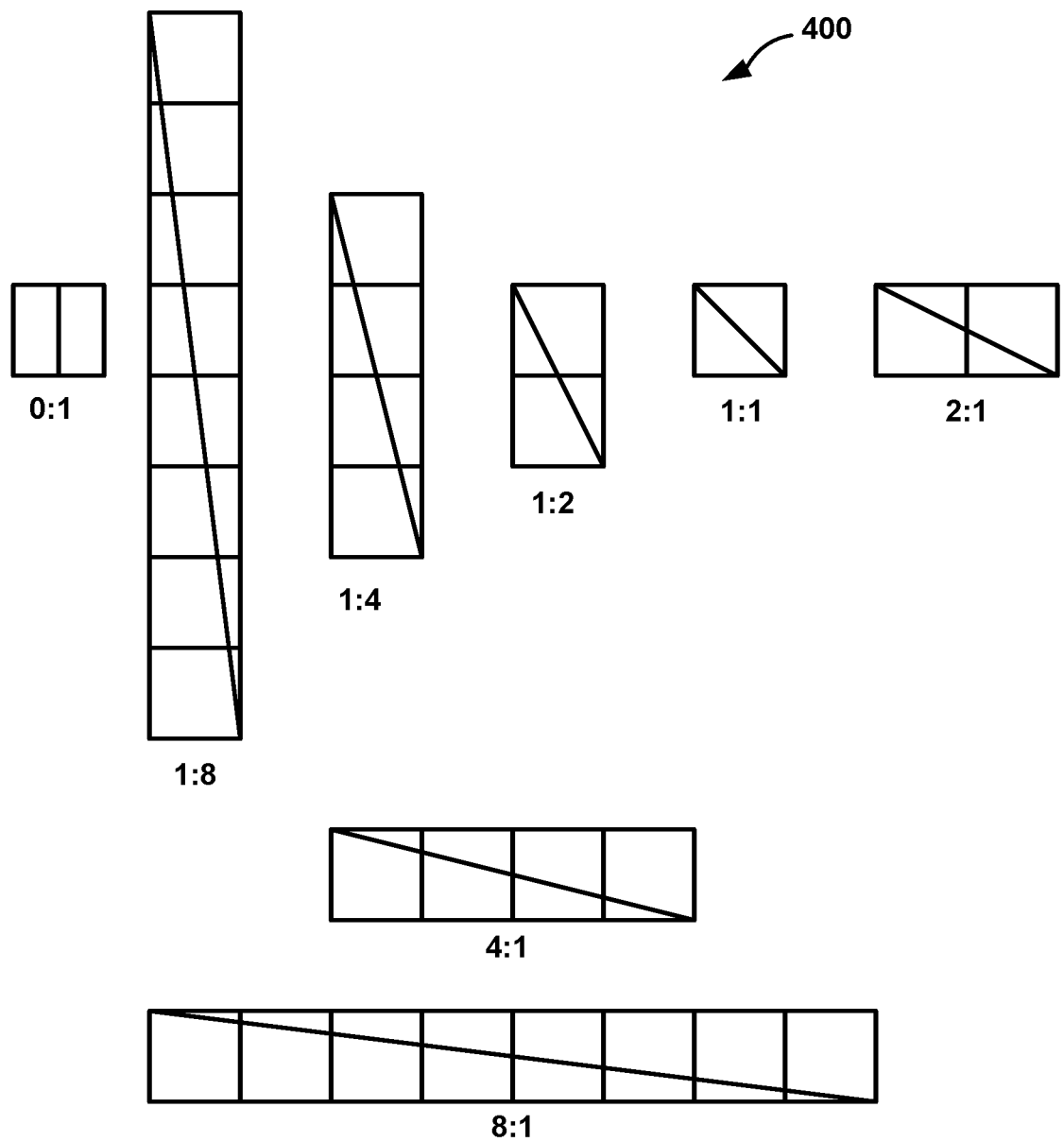
FIGS. 14A and 14B are conceptual diagrams illustrating proposed angles for GEO mode along with corresponding width-height ratios.
Figure 14B:
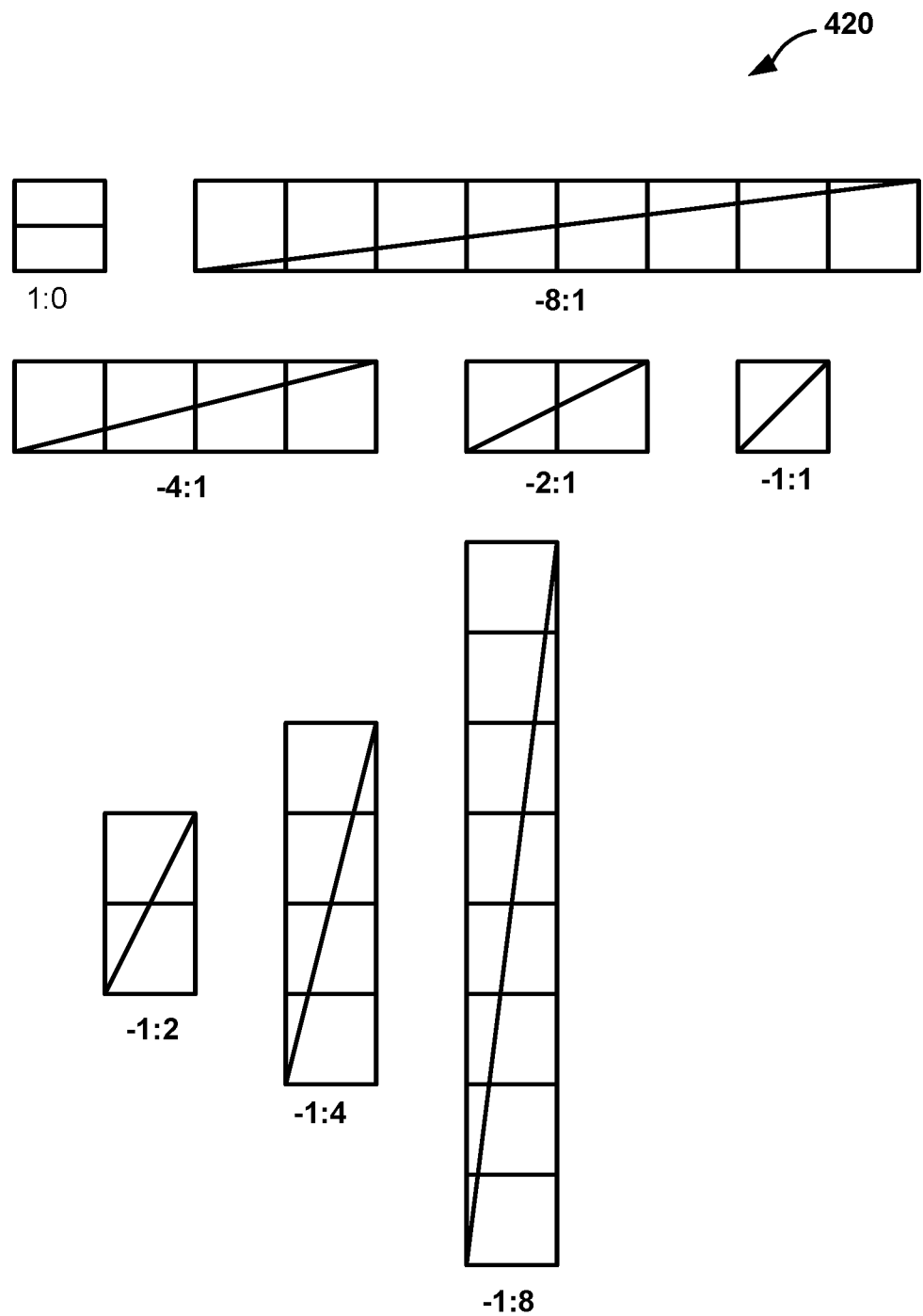

FIGS. 14A-14B are conceptual diagrams illustrating proposed angles for GEO mode along with corresponding width-height ratios. Several examples 400 and 420 of GEO mode blocks are shown of different sizes having tangents of angles with a power of 2.

Based on the slope-based GEO version 2 from JVET-P0107, The Dis[.] look up table is illustrated in Table 4.

TABLE 4

| 2 bits Dis[.] look-up table for slope-based GEO | | | | | | | | | | | |
|---|---|---|---|---|---|---|---|---|---|---|---|
| idx | 0 | 1 | 2 | 4 | 6 | 7 | 8 | 9 | 10 | 12 | 14 | 15 |
| Dis[idx] | 4 | 4 | 4 | 4 | 2 | 1 | 0 | −1 | −2 | −4 | −4 | −4 |
| idx | 16 | 17 | 18 | 20 | 22 | 23 | 24 | 25 | 26 | 28 | 30 | 31 |
| Dis[idx] | −4 | −4 | −4 | −4 | −2 | −1 | 0 | 1 | 2 | 4 | 4 | 4 |

With the slope-based GEO version 2, the computation complexity of GEO blending mask derivation is considered as a multiplication (up to 2 bits shift) and an addition. There are no different partitions as compared to TPM. Furthermore, the rounding operation of distFromLine is removed in order to more easily store the blending mask. This may ensure that sample weights are repeated in each row or column in a shifted fashion.

For example, see the information below between <SEE> and </SEE>
TPM:

TABLE 5

...
The variable wIdx is derived as follows:
- If cIdx is equal to 0 and triangleDir is equal to 0,
the following applies:
wIdx =( nCbW > nCbH ) ? ( Clip3( 0, 8, <SEE> ( x / nCbR - y ) + 4) </SEE> ) (8-842)
  : ( Clip3( 0, 8, <SEE> ( x - y / nCbR) + 4 ) </SEE>)s
- Otherwise, if cIdx is equal to 0 and triangleDir is equal to 1,
the following applies:
wIdx = ( nCbW > nCbH ) ? ( Clip3( 0, 8, <SEE>
( nCbH - 1 - x / nCbR - y ) + 4 ) </SEE> ) (8-843)
  ( Clip3( 0, 8, <SEE>
( nCbW - 1 - x - y / nCbR ) + 4 ) </SEE>)
- Otherwise, if cIdx is greater than 0 and triangleDir is equal to 0,
the following applies:
wIdx = ( nCbW >nCbH ) ? ( Clip3 <SEE> ( 0, 4, ( x / nCbR - y ) + 2) </SEE> ) (8-844)
  : ( Clip3 <SEE> ( 0, 4, ( x - y / nCbR) + 2 ) </SEE> )
- Otherwise (if cIdx is greater than 0 and triangleDir is equal to 1),
the following applies:
wIdx = ( nCbW > nCbH ) ? ( Clip3( 0, 4, <SEE>
( nCbH - 1 - x / nCbR - y ) + 2 ) </SEE> ) (8-845)
  ( Clip3( 0, 4, <SEE>
( nCbW - 1 - x - y / nCbR ) + 2 ) </SEE> )
...

GEO

Angle idx is 0: <SEE>((x<<1)+1)*(4<<1)-((y<<1)+1))*(1<<1)-rho</SEE>

Angle idx is 4: <SEE>((x<<1)+1)*(4<<1)-((y<<1)+1))*(4<<1)-rho</SEE>

Angle idx is 6: <SEE>((x<<1)+1)*(2<<1)-((y<<1)+1))*(4<<1)-rho</SEE>

JVET-P0304 proposed to derive the weights and the mask for motion field storage for all blocks and partition modes from two sets of pre-defined masks—one for the blending weights derivation and the other for the masks of motion field storage. There may be a total of 16 masks in each set. Video encoder 200 or video decoder 300 may calculate each mask per angle using the same equations in GEO with block width and block height set to 256 and displacement set to 0. For a block of size W×H with angle φ and distance ρ, the blending weights for the luma samples are directly cropped from the pre-defined masks with offsets calculated as follows:

Variables offsetX and offsetY are calculated as follows:

$$\text{offsetX} = \begin{cases} (M - W) \gg 1 & \varphi \% 16 = 8 \text{ or } (\varphi \% 16 \neq 0 \text{ and } H \geq W) \\ ((M - W) \gg 1) + \varphi < 16? (\rho \times W) \gg 3 : -((\rho \times W) \gg 3) & \text{otherwise} \end{cases}$$

if $(\varphi \% 16 = 8)$ or $(\varphi \% 16 \neq 0$ and $H \geq W)$, offsetX $= (M - W) \gg 1$;

otherwise, offsetX $= ((M - W) \gg 1) + \varphi < 16? (\rho \times W) \gg 3 : -((\rho \times W) \gg 3)$.

$$\text{offsetY} = \begin{cases} ((M - W) \gg 1) + \varphi < 16? (\rho \times W) \gg 3 : -((\rho \times W) \gg 3) & \varphi \% 16 = 8 \text{ or } (\varphi \% 16 \neq 0 \text{ and } H \geq W) \\ (M - W) \gg 1 & \text{otherwise} \end{cases}$$

sampleWeight$_L$[x][y] = g_sampleWeight$_L$[φ % 16][x + offsetX][y + offsetY].–, where g_sampleWeight$_L$ [ ] represents the pre-defined masks for the blending weights.

During the Geneva meeting, it was also pointed out that with the proposed GEO design, since the angles used by GEO were identical to the angles used by TPM, the TPM mode could be completely removed. Two partitions (namely angles 45° and 135° using displacement equal to 0) needed to be added for GEO to be able to reproduce the TPM partitions. Those 2 partitions were therefore added to the GEO version to be tested in the Core Experiment. As TPM was permitted on CUs with width:height ratios of 1:16 and 16:1 (8×128 and 128×8) and those angles were not present in JVET-P0884/JVET-P0885, GEO was disallowed on those block sizes. The number of partitions for the GEO version tested in the Core Experiment was 82.

Some hardware experts believe that the number of GEO partitions may still be too high, even if the number of GEO partitions was reduced from 140 in JVET-O0489 down to 82 in JVET-P0884/JVET-P0885. The reasons some hardware experts believe the number of GEO partitions is still too high may include: 1) 82 is a high number of cases to test in a conformance check (19 allowed PU sizes times 82 modes gives a total of 1558 cases to test for GEO); and 2) an encoder, such as video encoder 200, that is implemented to support a smaller number of GEO modes would suffer some quality losses with the current design.

Using a smaller number of modes for GEO may solve those issues. The GEO design of JVET-P0884/JVET-P0885 supports 82 different modes which are signaled by a video encoder, such as video encoder 200, using a truncated binary code. Using a more adapted code with codewords of smaller length for GEO modes that are more often used could provide coding gains.

Additionally, the quantization values used for GEO angles may not be optimal. Using a different quantization table could lead to improvements.

In accordance with the GEO design of JVET-P0884/JVET-P0885, with the suggestions from JVET-P0107, a video coder, such as video encoder 200 or video decoder 300 may use the following equation to compute its distance to the split:

distFromLine=(((x+offsetX)<<1)+1)×Dis[displacementX]+(((y+offsetY)<<1)+1)×Dis[displacementY]-ρ

Where [((x+offsetX)<<1)+1; ((y+offsetY)<<1)+1] is the position in cartesian coordinates of the center of each sample. Dis[displacementX] and Dis[displacementY] are respectively the quantized cosine and sine values of the angle used. ρ corresponds to the displacement. Therefore, the equation if of the form distFromLine=X×cos(α)—Y×sin(α)-ρ

Where both the cosine and sine values are quantized to powers of 2 and using a tangent based implementation and an equation of the form $$\text{distFromLine} = \cos(\alpha) \times (X - Y \times \tan(\alpha)) - \rho$$

Or $$\text{distFromLine} = \sin(\alpha) \times (\cot(\alpha) \times X - Y) - \rho$$

is mathematically equivalent, but would use one less approximation, as the chosen angles have integer tangents.

Reducing the number of allowed GEO modes for each PU may be desirable. However, in order to reduce the impact on the coder performance that may occur when removing some angles or displacements, it may be desirable to keep all proposed 82 modes, but only allow a subset of modes for each particular PU.

FIGS. 15A-15B are tables illustrating example GEO modes available based on PU size according to the techniques of this disclosure. For example, according to the techniques of this disclosure, the number of GEO modes allowed for each PU may be limited to 32. In some examples, when limiting the number of GEO modes to 32, the GEO modes may be used for each PU size as shown in FIGS. 15A-15B, where the GEO modes available for a PU with width equal to W and height equal to H would be in the corresponding column. For example, for a PU size of 8×8, the GEO modes available would include 1, 2, 41, 0, etc., reading down the column of W=8 and H=8.

In some examples, the 32 most used modes for each PU size are in the subset for the particular PU size. Therefore, each PU only has access to 32 GEO modes instead of 82, but the overall variety of GEO is maintained. In some examples, video encoder 200 may use a variable length code instead of a fixed length code to indicate to video decoder 300 which of the 32 most used modes are used. For example, the first 2 modes may be coded using 2 bins, while the remaining 30 modes are coded using 1 flag plus a truncated binary code.

In some examples, a fixed number (but different set) of angles may be selected depending on the block shape. The angles that are closest to the diagonal/anti-diagonal angles of the block may be selected from a predefined set of angles. In one example, the predefine set of angles includes the angles 0, 90, 180, 270, and those angles that have tangent values equal to M/N, wherein M and N are both integers. In some examples, video encoder 200 may use a variable length code is used instead of a fixed length code to signal to video decoder 300 the selected angles. For example, the first 2 modes are coded using 2 bins while the remaining are coded using 1 flag plus a truncated binary code for next 30 modes.

GEO mode is efficient at capturing the edges of a picture. As such, it is likely that neighboring blocks may be useful to predict which of the GEO modes would be useful in a given PU. Video encoder 200 may restrict the GEO modes for a given PU based on the GEO modes of neighboring PUs. In some examples, if one of the neighboring PUs uses GEO mode, only the GEO modes using the same angle may be used on the current PU. In some examples, if one of the neighboring PUs uses GEO mode, only the GEO modes using the same angle, or a neighboring angle, may be used on the current PU. In some examples, if one of the neighboring PUs uses GEO mode, only the GEO modes having a split starting point at the location of the end of the split of the neighboring PU may be used. In some examples, if the neighboring PUs split on the edge of the current PU, only the GEO modes that have a split starting point at the location of the neighboring PU split may be used.

Figure 16A:
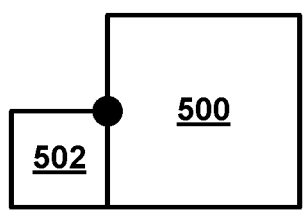
FIGS. 16A-16F are conceptual diagrams illustrating examples of using neighboring blocks to determine available GEO modes.
Figure 16B:
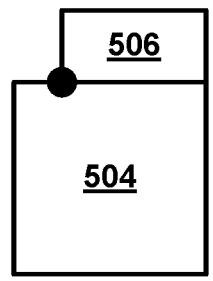
Figure 16C:
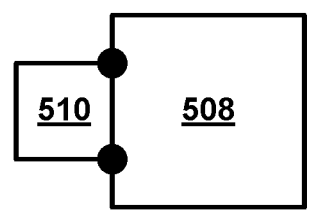
Figure 16D:
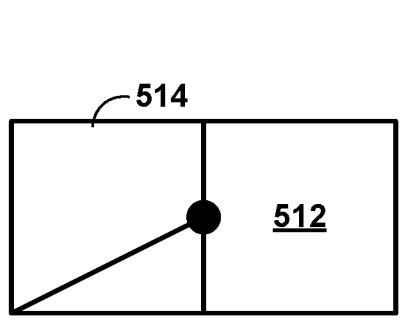

FIGS. 16A-16F are conceptual diagrams illustrating examples of using neighboring blocks to determine available GEO modes. In some examples, video encoder 200 or video decoder 300 may use the intersection of the neighboring partition line and the boundary of current block to derive the available modes. Examples of such intersections are illustrated in FIGS. 16A-16F. The type of intersections in these examples may be classified in two categories. One category is called CU partition intersection which is generated by a neighboring CU splitting. For example, in the example of FIG. 16A, current block 500 has neighboring block 502 which has been split. In FIG. 16B, current block 504 has neighboring block 506 which has been split. In FIG. 16C, current block 508 has neighboring block 510 which has been split.

Figure 16E:
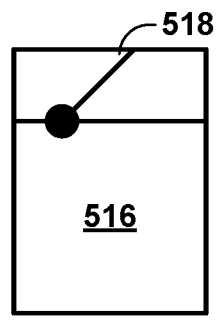
Figure 16F:
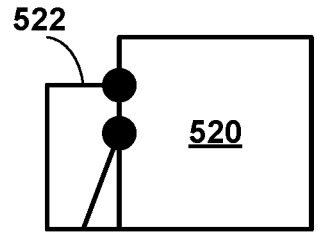

The other category is called GEO partition intersection which is generated by a GEO predicted neighboring block. For example, in FIG. 16D, current block 512 has neighboring block 514 which has been GEO partitioned. In FIG. 16E, current block 516 has neighboring block 518 which has been GEO partitioned. In FIG. 16F, current block 520 has neighboring block 522 which has been GEO partitioned.

In some examples, video encoder 200 may use both CU partition and GEO partition intersection (represented by the black dots in FIGS. 16A-16F) to derive the available modes of a current PU. In some examples, only the GEO partition intersection may be used which may decrease the complexity of video encoder 200.

Figure 17A:
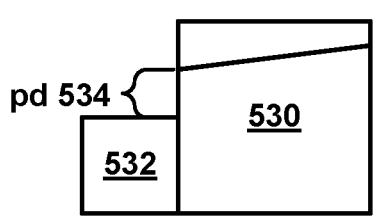
FIGS. 17A-17D are conceptual diagrams illustrating examples of a partition distance, pd, between the intersection of neighboring partitions and a starting point of a current GEO partition.
Figure 17B:
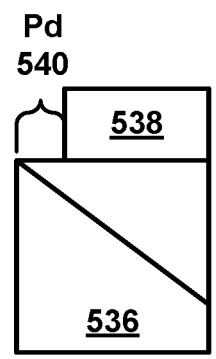
Figure 17C:
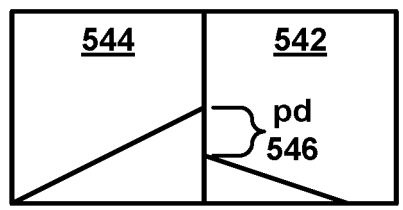
Figure 17D:
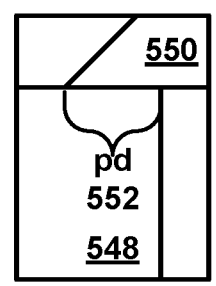

FIGS. 17A-17D are conceptual diagrams illustrating examples of a partition distance, pd, between the intersection of neighboring partitions and a starting point of a current GEO partition. For example, in FIG. 17A, current block 530 and neighboring block 532 are shown. In this example, pd 534 is the distance between the intersection of the neighboring partition (the top of neighboring block 532) and the starting point of the GEO partition in current block 530. In FIG. 17B, current block 536 and neighboring block 538 are shown. In this example, pd 540 is the distance between the intersection of the neighboring partition (the left of neighboring block 538) and the starting point of the GEO partition in current block 536. In FIG. 17C, current block 542 and neighboring block 544 are shown. In this example, pd 546 is the distance between the intersection of the neighboring partition (the GEO mode partition of neighboring block 544) and the starting point of the GEO partition in current block 542. In FIG. 17D, current block 548 and neighboring block 550 are shown. In this example, pd 552 is the distance between the intersection of the neighboring partition (the GEO mode partition of neighboring block 550) and the starting point of the vertical partition in current block 548. In some examples, video encoder 200 may determine the available GEO modes of a PU by the partition distance pd between the intersection caused by neighboring partition and the starting point of current GEO partition. In some examples, if the distance pd of a GEO mode current PU is smaller than a predetermined threshold, the mode is available in the current PU. In some examples, if a neighboring block is in a different CTU/tile/slice/subpicture compared to the current block, video encoder 200 or video decoder 300 may not use the neighboring to derive available modes.

In some examples, video encoder 200 or video decoder may construct a list of available modes by firstly inserting the GEO modes that have a pd smaller than a predetermined threshold. After that, if the list is not full, video encoder 200 or video decoder 300 may add default modes until the list is full.

The number of available GEO modes may be reduced by adaptively deciding the distance ρ of a GEO angle. In this example, the angle of a current PU is still needed to be signaled by video encoder 200, e.g., but video decoder 300 could derive the distance with or without signaling. After parsing the GEO angle, video decoder 300 may derive the distance of the angle using the neighboring blocks.

In some examples, the number of the available distances of a GEO angle may be set to a positive integer N. A distance candidate derivation process may be used to generate the N distance candidates. If N is equal to 1, the distance may be derived without signaling. If N is larger than 1, video encoder 200 may signal a distance candidate index, for example. The number N may be smaller than the number of total available distances in GEO.

In some examples, the distance candidates may be derived based on the partition distance pd. If the candidate number is N, video encoder 200 or video decoder 300 may select the N distances with minimum pd as the candidates. If there is not any neighboring intersection, some default distances may be added as distance candidates.

In some examples, if the candidate number is N, video encoder 200 and video decoder 300 may select the distances which have a pd smaller than a threshold as the candidates. If the candidate number is still N after this, some default distances may be added as distance candidates.

GEO signaling may be changed by applying the notion of a Most Probable Mode (MPM) list, where video encoder 200 may signal the modes considered more probable with a shorter codeword than modes considered less probable.

In some examples, the signaling may be changed so that video encoder 200 may signal the angles corresponding to diagonal and anti-diagonal (e.g., former TPM modes that are special cases of GEO modes with a zero distance offset) with a shorter codeword. Those two modes may be coded in 2 bins (e.g., one flag to signal that the mode is one of the two MPMs, followed by one flag to say which of the two modes is used). The remaining modes may be coded using a truncated binary code with maximum value being the total number of GEO partitions minus 2. For example, video decoder 300 may receive a sequence of bits containing (b0), (1−b0)(b1) or (1−b0)(1−b1)(truncated binary code) to indicate whether diagonal, anti-diagonal or one of remaining modes is used, where b0 and b1 can be both 1 (or 0). In another example, video decoder 300 may receive a sequence of bits containing (b0), (1−b0)(b1) or (1−b0)(1−b1)(truncated binary code) to indicate whether anti-diagonal, diagonal or one of remaining modes is used, where b0 and b1 can be both 1 (or 0).

In some examples, the techniques described above, to reduce the number of GEO modes, may be used to find which modes are the most probable. Instead of keeping some modes and completely removing the others, a flag can be used to determine whether the mode used is from a smaller subset than all the modes or not.

For example, a table containing the modes ordered by usage may be used. The signaling cost to the video encoder 200 and video decoder 300 of the most frequently used modes (e.g., the modes at the beginning of the table) may be shorter than the modes at the end of the table. Video encoder 200 or video decoder 300 may then update the table based on the modes used in a slice.

In some examples, a counter of occurrence is kept for each mode. For example, video encoder 200 or video decoder 300 may increment the counter for a given GEO mode for each time that given GEO mode is used. When the counter reaches a certain threshold, video encoder 200 or video decoder 300 may move that GEO mode down the list to reduce its cost. In some examples, every time a GEO mode is used, video encoder 200 or video decoder 300 may swap that GEO mode with the GEO mode one down in the list. In some examples, for every time a GEO mode is used, the table may be a 2-entry list which video encoder 200 or video decoder 300 may always reform by using the GEO mode of causal neighboring blocks, e.g., left and above block.

When both left and above blocks are GEO-coded, the table may be either {GEOleft, GEOabove} or {GEOabove, GEOleft}. When only one of a left and an above block are GEO-coded, the table may be {GEOleft, GEOdefault} if left block is GEO-coded or {GEOabove, GEOdefault} if above block is GEO-coded, where GEOdefault may be either diagonal angle with zero distance offset or anti-diagonal angle with zero distance offset.

When neither a left block nor an above block is GEO-coded, video encoder 200 or video decoder 300 may use a default table, which may be either {diagonal angle with zero distance offset, anti-diagonal angle with zero distance offset} or {anti-diagonal angle with zero distance offset, diagonal angle with zero distance offset}, for example.

A causal-neighboring block to the left or to the above of the current block may be regarded as unavailable if the causal-neighboring block crosses a tile/slice/sub-picture boundary, where the current tile/slice/subpicture is independent from the corresponding neighboring tile/slice/subpicture.

In some example, video encoder 200 or video decoder 300 may refresh and re-initialize the table across a tile/slice/subpicture boundary when causal neighboring tiles/slices/sub-pictures and the current tile/slice/subpicture boundary are independent from each other.

In the process of computing the distance of a sample to the split line the following equation may be replaced $$\text{distFromLine}=(((x+\text{offsetX})<<1)+1)\times\text{Dis}[\text{displacementX}]+(((y+\text{offsetY})<<1)+1)\times\text{Dis}[\text{displacementY}]-\rho$$

with an equation having added precision.

In some examples, the above equation is replaced with $$\text{distFromLine}=\text{Dis}[\text{displacementX}]((((x+\text{offsetX})<<1)+1)+(((y+\text{offsetY})<<1)+1)\times\tan[\text{displacementX}])-\rho$$

when displacementX corresponds to an angle with tangent above 1, and $$\text{distFromLine}=\text{Dis}[\text{displacementY}]((((x+\text{offsetX})<<1)+1)\times\cot[\text{displacementX}]+(((y+\text{offsetY})<<1)+1))-\rho$$

otherwise (e.g., when the angle corresponds to a tangent below 1, and where tan[displacementX] and cot[displacementX] being arrays storing the tangent and cotangent of the angles used in GEO mode.

In some examples, the quantization of cosine for the Dis table for angles equal to 4, 12, 20 and 28 (corresponding to angles 45°, 135°, 225° and 315°, respectively) may be changed to be closer to the corresponding cosine value of those angles. For example, video encoder 200 or video decoder 300 may use the Dis table (which may be a look-up table) shown as Table 6 below in which the Dis[idx] corresponding to idx 4 is changed from 4 to 2, the Dis[idx] corresponding to idx 12 is changed from −4 to −2, the Dis[idx] corresponding to idx 20 is changed from −4 to −2, and the Dis[idx] corresponding to idx 28 is changed from 4 to 2 compared to Table 4 above. The displacement values in the table below may be indicative of a distance from a center of a PU to a GEO split.

TABLE 6

| idx | 0 | 1 | 2 | 4 | 6 | 7 | 8 | 9 | 10 | 12 | 14 | 15 |
|---|---|---|---|---|---|---|---|---|---|---|---|---|
| Dis[idx] | 4 | 4 | 4 | 2 | 2 | 1 | 0 | −1 | −2 | −2 | −4 | −4 |
| idx | 16 | 17 | 18 | 20 | 22 | 23 | 24 | 25 | 26 | 28 | 30 | 31 |
| Dis[idx] | −4 | −4 | −4 | −2 | −2 | −1 | 0 | 1 | 2 | 2 | 4 | 4 |

Figure 18:
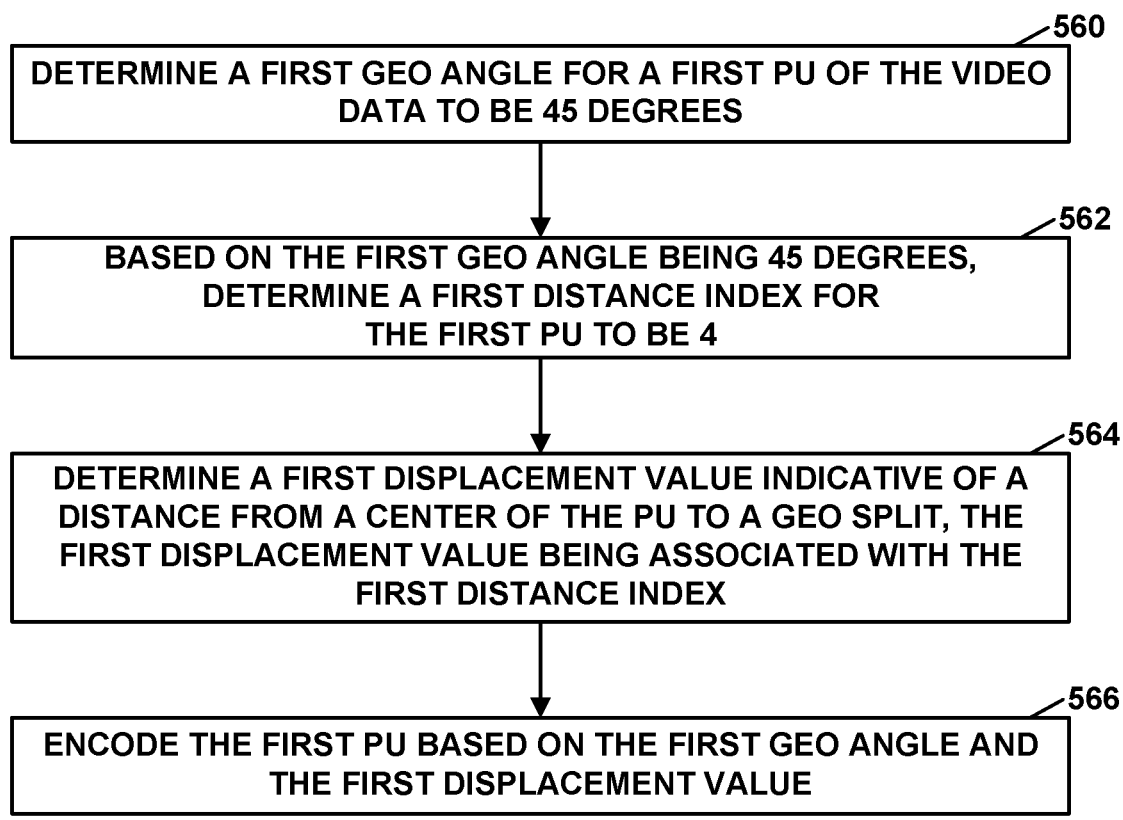
FIG. 18 is a flowchart illustrating example GEO mode encoding techniques according to this disclosure.

FIG. 18 is a flowchart illustrating example GEO mode encoding techniques according to this disclosure. Video encoder 200 may determine a first GEO angle for a first PU of the video data to be 45 degrees (560). For example, video encoder 200 may perform multiple encoding passes to test combinations of encoding parameters and resulting rate-distortion values for such combinations and may determine that the first PU should be encoded in GEO mode with the first GEO angle of 45 degrees.

Based on the first GEO angle being 45 degrees, video encoder 200 may determine a first distance index for the first PU to be 4 (562). For example, a distance index of 4 may be associated with a GEO angle of 45 degrees. Video encoder 200 may determine a first displacement value based on the first distance index (564). For example, video encoder 200 may look up the distance index of 4 in a look-up table to determine the first displacement value.

Video encoder 200 may encode the first PU based on the first GEO angle and the first displacement value (566). For example, video encoder 200 may encode the first PU using GEO mode with a GEO angle of 45 degrees using the first displacement value. In some examples, the first displacement value (e.g., the displacement value associated with the distance index of 4) is half of a displacement value associated with a distance index of 2. In some examples, video encoder 200 may signal the first distance index in a bitstream. In some examples, the first displacement value is associated with a quantization level of a cosine of the first GEO angle.

In some examples, video encoder 200 may determine a second GEO angle for a second PU of the video data to be 135 degrees. For example, video encoder 200 may perform multiple encoding passes to test combinations of encoding parameters and resulting rate-distortion values for such combinations and may determine that the second PU should be encoded in GEO mode with the second GEO angle of 135 degrees. Based on the second GEO angle being 135 degrees, video encoder 200 may determine a second distance index for the second PU to be 12. For example, a distance index of 12 may be associated with a GEO angle of 135 degrees. Video encoder 200 may determine a second displacement value based on the second distance index. For example, video encoder 200 may look up the distance index of 12 in a look-up table to determine the second displacement value. Video encoder 200 may encode the second PU based on the second GEO angle and the second displacement value. For example, video encoder 200 may encode the second PU using GEO mode with an angle a GEO angle of 135 degrees using the second displacement value. The second displacement value (e.g., the displacement value associated with the distance index of 12) may be half a displacement value associated with a distance index of 14.

In some examples, video encoder 200 may determine a second GEO angle for a second PU of the video data to be 225 degrees. For example, video encoder 200 may perform multiple encoding passes to test combinations of encoding parameters and resulting rate-distortion values for such combinations and may determine that the second PU should be encoded in GEO mode with the second GEO angle of 225 degrees. Based on the second GEO angle being 225 degrees, video encoder 200 may determine a second distance index for the second PU to be 20. For example, a distance index of 20 may be associated with a GEO angle of 225 degrees. Video encoder 200 may determine a second displacement value based on the second distance index. For example, video encoder 200 may look up the distance index of 20 in a look-up table to determine the second displacement value. Video encoder 200 may encode the second PU based on the second GEO angle and the second displacement value. For example, video encoder 200 may encode the second PU using GEO mode with an angle a GEO angle of 225 degrees using the second displacement value. The second displacement value (e.g., the displacement value associated with the distance index of 20) may be half a displacement value associated with a distance index of 18.

In some examples, video encoder 200 may determine a second GEO angle for a second PU of the video data to be 315 degrees. For example, video encoder 200 may perform multiple encoding passes to test combinations of encoding parameters and resulting rate-distortion values for such combinations and may determine that the second PU should be encoded in GEO mode with the second GEO angle of 315 degrees. Based on the second GEO angle being 315 degrees, video encoder 200 may determine a second distance index for the second PU to be 28. For example, a distance index of 28 may be associated with a GEO angle of 315 degrees. Video encoder 200 may determine a second displacement value based on the second distance index. For example, video encoder 200 may look up the distance index of 28 in a look-up table to determine the second displacement value. Video encoder 200 may encode the second PU based on the second GEO angle and the second displacement value. For example, video encoder 200 may encode the second PU using GEO mode with an angle a GEO angle of 315 degrees using the second displacement value. The second displacement value (e.g., the displacement value associated with the distance index of 28) may be half a displacement value associated with a distance index of 30.

Figure 19:
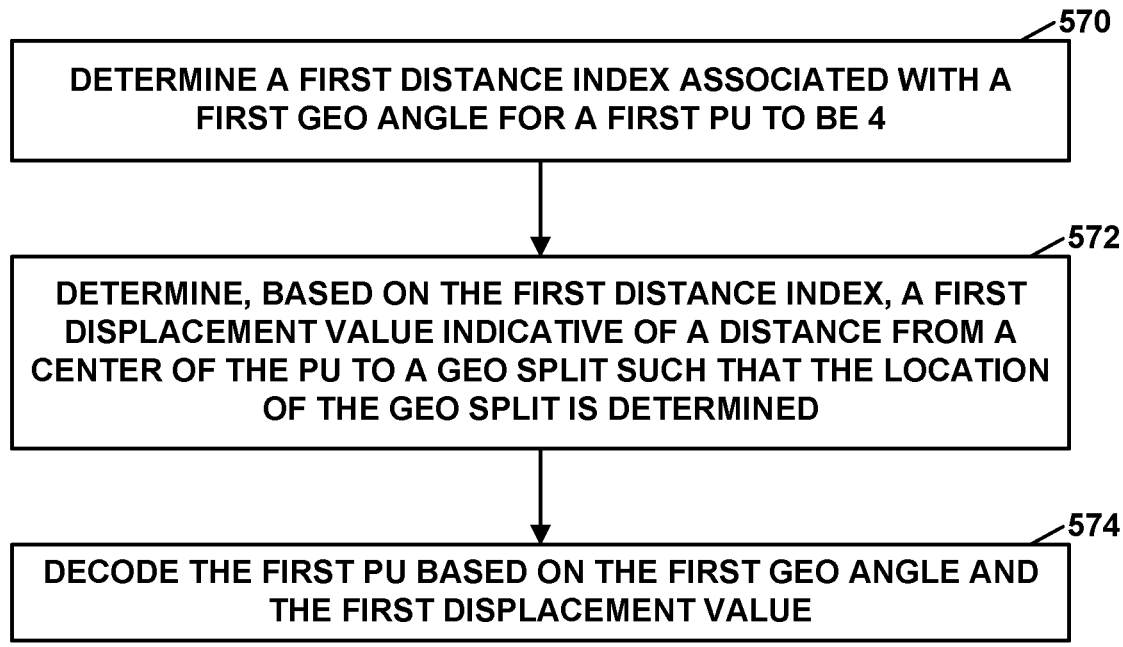
FIG. 19 is a flowchart illustrating example GEO mode decoding techniques according to this disclosure.

FIG. 19 is a flowchart illustrating example GEO mode decoding techniques according to this disclosure. Video decoder 300 may determine a first distance index associated with a first GEO angle for a first PU of the video data to be 4 (570). For example, video decoder 300 may parse a syntax element of a bitstream indicative of the first distance index to determine the first distance index. Video decoder 300 may determine, based on the first distance index, a first displacement value indicative of a distance from a center of the first PU to a GEO split such that the location of the GEO split is determined (572). For example, video decoder 300 may look up the distance index of 4 in a look-up table to determine the first displacement value. Video decoder 300 may decode the first PU based on the first GEO angle and the first displacement value (574). For example, video decoder 300 may decode the first PU using GEO mode with a GEO angle of 45 degrees using the first displacement value. In some examples, the first displacement value (e.g., the displacement value associated with the distance index of 4) is half of a displacement value associated with a distance index of 2. In some examples, the first displacement value is associated with a quantization level of a cosine of the first GEO angle.

In some examples, video decoder 300 may determine a second distance index associated with a second GEO angle for a second PU of the video data to be 12. For example, video decoder 300 may parse a syntax element of a bitstream indicative of the second distance index to determine the second distance index. Video decoder 300 determine a second displacement value based on the second distance index. For example, video decoder 300 may look up the distance index of 12 in a look-up table to determine the second displacement value. Video decoder 300 may decode the second PU based on the second GEO angle and the second displacement value. For example, video decoder 300 may decode the second PU using GEO mode with a GEO angle of 135 degrees using the second displacement value. In some examples, the second displacement value (e.g., the displacement value associated with the distance index of 12) is half a displacement value associated with a distance index of 14.

In some examples, video decoder 300 may determine a second distance index associated with a second GEO angle for a second PU of the video data to be 20. For example, video decoder 300 may parse a syntax element of a bitstream indicative of the second distance index to determine the second distance index. Video decoder 300 determine a second displacement value based on the second distance index. For example, video decoder 300 may look up the distance index of 20 in a look-up table to determine the second displacement value. Video decoder 300 may decode the second PU based on the second GEO angle and the second displacement value. For example, video decoder 300 may decode the second PU using GEO mode with a GEO angle of 225 degrees using the second displacement value. In some examples, the second displacement value (e.g., the displacement value associated with the distance index of 20) is half a displacement value associated with a distance index of 18.

In some examples, video decoder 300 may determine a second distance index associated with a second GEO angle for a second PU of the video data to be 28. For example, video decoder 300 may parse a syntax element of a bitstream indicative of the second distance index to determine the second distance index. Video decoder 300 determine a second displacement value based on the second distance index. For example, video decoder 300 may look up the distance index of 28 in a look-up table to determine the second displacement value. Video decoder 300 may decode the second PU based on the second GEO angle and the second displacement value. For example, video decoder 300 may decode the second PU using GEO mode with a GEO angle of 315 degrees using the second displacement value. In some examples, the second displacement value (e.g., the displacement value associated with the distance index of 28) is half a displacement value associated with a distance index of 30.

Figure 20:
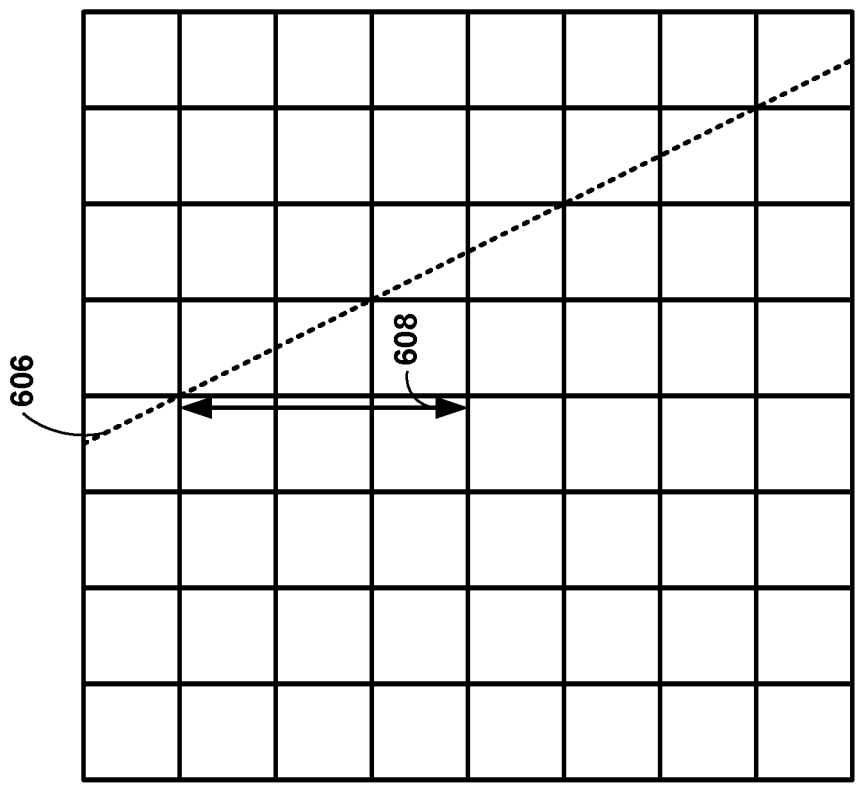
FIG. 20 is a conceptual diagram illustrating example split lines for GEO mode on 8×8 blocks.
Figure 20:
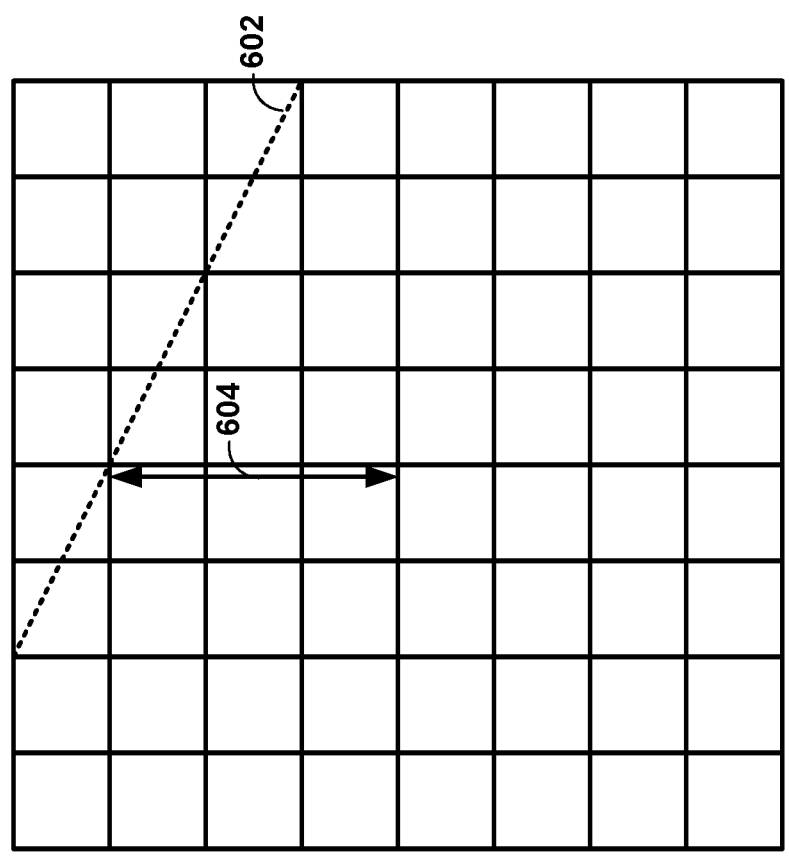

FIG. 20 is a conceptual diagram illustrating example split lines for GEO mode on 8×8 blocks. Video encoder 200 or video decoder 300 compute the displacement for square blocks in the same way as when blocks have a height higher than width. This means that 2 angles that are symmetrical compared to angle 45° (resp 135°) will not produce splits that are symmetrical compared to 45° (resp. 135°). As shown in FIG. 20, split line 602 (shown as a dashed line) is a GEO mode split line with an angle of 2:1 and a displacement of 3 (represented by arrow 604) from the center of the block. Split line 606 is a GEO mode split line with an angle of 1:2 and a displacement 3 (represented by arrow 608) from the center of the block. While the angle ratios and displacements are identical in the example of FIG. 20, the produced blocks do not have similar shapes. By causing those blocks to have similar shapes may make coder design more consistent and provide better performance.

Figure 21:
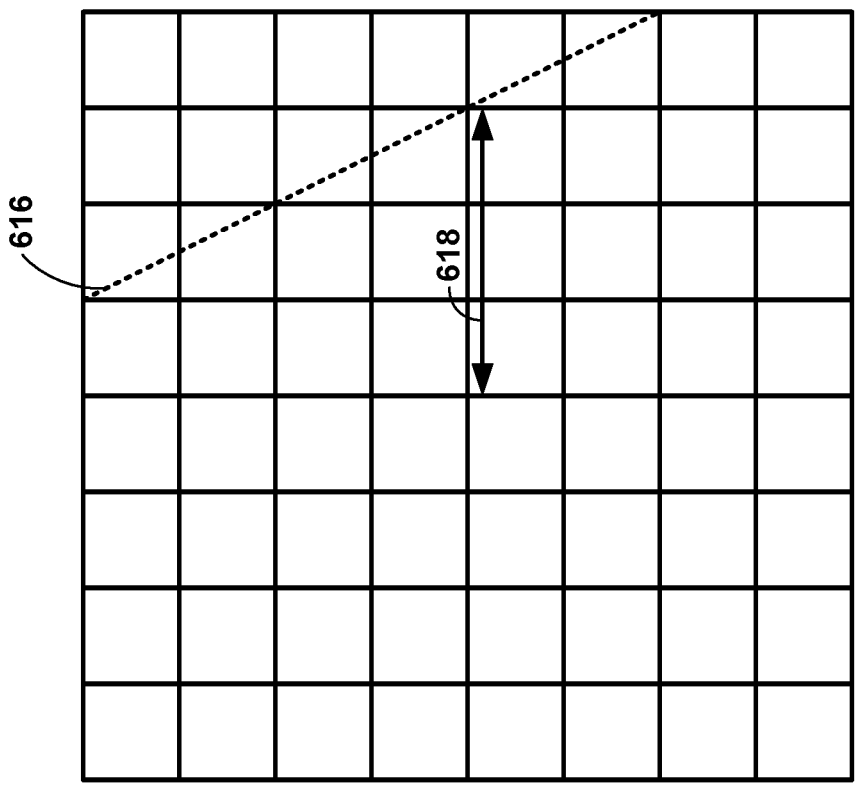
FIG. 21 is a conceptual diagram illustrating further example split lines of GEO mode on 8×8 blocks according to the techniques of this disclosure.
Figure 21:
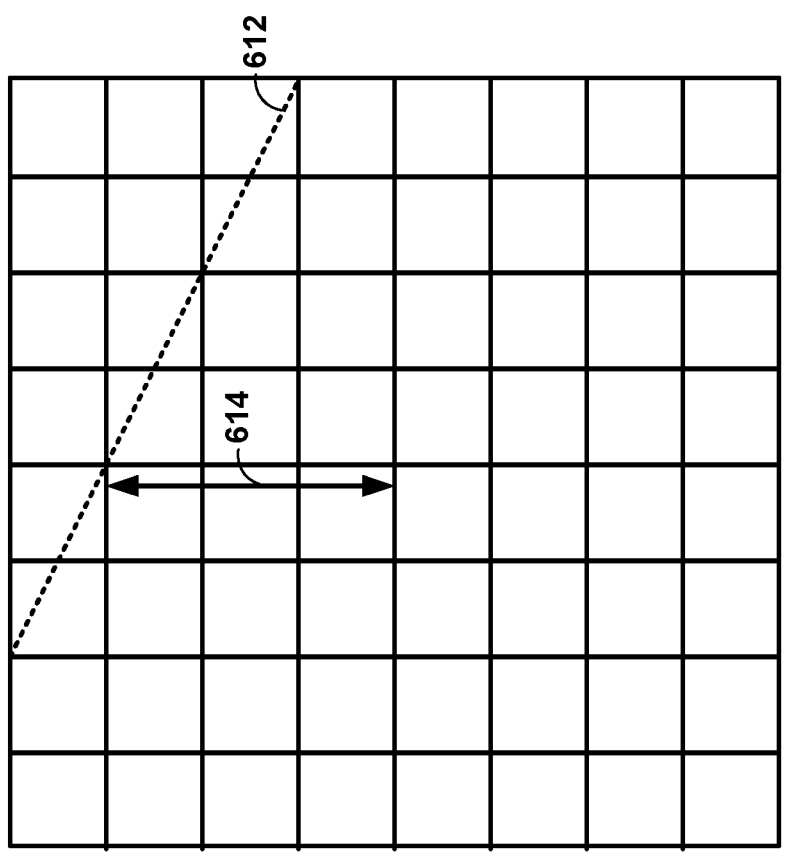

Changing the displacement computation for square blocks is now discussed. FIG. 21 is a conceptual diagram illustrating further example split lines of GEO mode on 8×8 blocks according to the techniques of this disclosure. For example, split line 612 is a GEO mode split line with an angle of 2:1 and a displacement of 3 (represented by arrow 614) from the center of the block. Split line 616 is a GEO mode split line with an angle of 1:2 and a displacement of 3 (represented by arrow 618) from the center of the block. Note that the displacement of split line 616 is measured horizontally instead of vertically. In some examples, for square blocks, when the angle is vertical (e.g., when the width (e.g., horizontal distance) to height ratio (e.g., vertical distance) is such that the width is less than the height, video encoder 200 or video decoder 300 may compute the displacement based on the width (or horizontal direction). The displacement of non-vertical angles is still computed based on height (or vertical direction). For example, video encoder 200 and video decoder 300 may compute the displacement of vertical angles based on width and of non-vertical angles based on height. As such, the angles provided in the example of FIG. 20 become those depicted in FIG. 21. It should be noted that the shapes of the two partitions on either side of split line 612 are much more similar to the shapes on either side of split line 616 than the shapes one either side of split line 602 are to the shapes on either side of split line 606.

Figure 22:
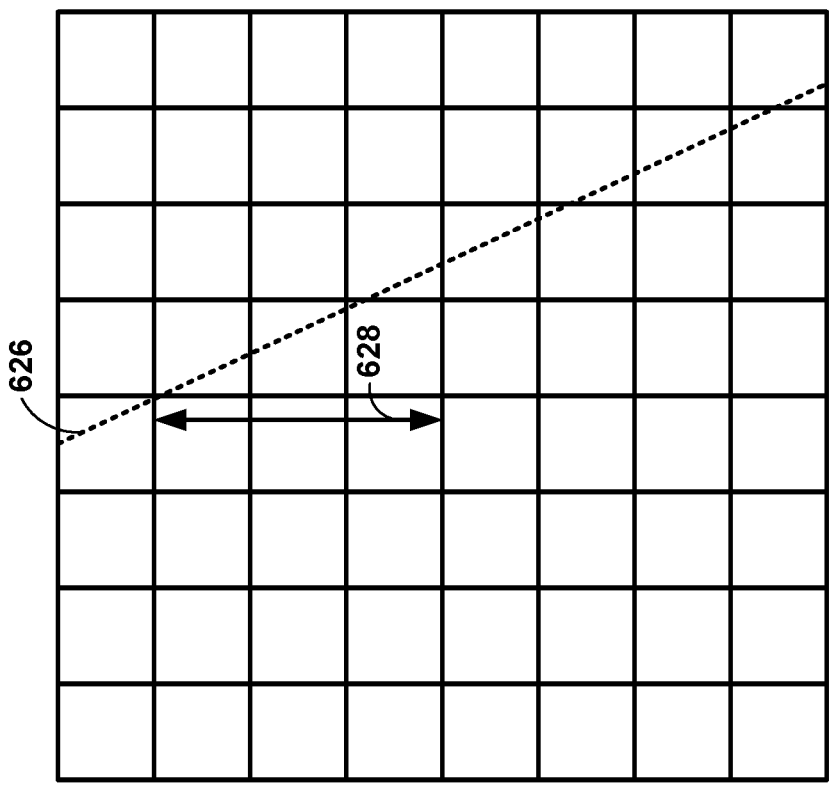
FIG. 22 is a conceptual diagram illustrating further example split lines of GEO mode on 8×8 blocks according to the techniques of this disclosure.
Figure 22:
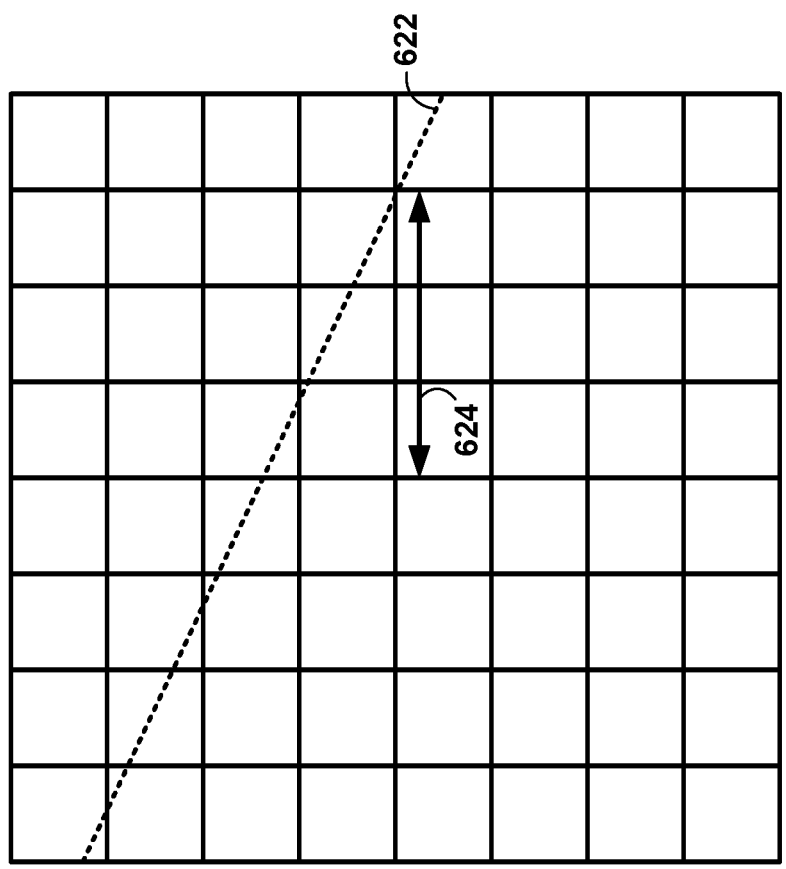

FIG. 22 is a conceptual diagram illustrating further example split lines of GEO mode on 8×8 blocks according to the techniques of this disclosure. Split line 622 is a GEO mode split line with an angle of 2:1 and a displacement of 3 (represented by arrow 624) from the center of the block. Split line 626 is a GEO mode split line with an angle of 1:2 and a displacement of 3 (represented by arrow 628). In some examples, for square blocks, when the angle is horizontal (e.g., when the width (e.g., horizontal distance) to height ratio (e.g., vertical distance) is such that the width is greater than the height, video encoder 200 or video decoder 300 computes the displacement becomes based on the width (in the horizontal direction). The displacement of non-horizontal angles is still computed based on height. For example, video encoder 200 and video decoder 300 may compute the displacement of horizontal angles based on width and of non-vertical angles based on height. As such, the angles provided as example in FIG. 20 becomes those depicted in FIG. 22.

Other techniques for reducing the number of GEO modes are now discussed. In some examples, the GEO modes are selected based on PU width/height ratio instead of PU size. In other words, video encoder 200 and video decoder 300 may use modes selected based on PU width/height ratio.

In some examples, video encoder 200 may select GEO modes according to the following rules: Rule 1—the GEO modes with an angle ratio equal to the PU width/height ratio are allowed, with all their 7 displacements (e.g., the two former TPM modes, with displacement 0, 1, 2, 3 in both directions (positive and negative), totaling to 14 modes). Rule 2—the GEO modes with a neighbor to the PU having an angle ratio equal to the width/height ratio are allowed, with displacement 0 and 3. Rule 3—if width/height<=1, the perfect vertical angles with displacement 1 and 3 in both directions (positive and negative) are kept, as well as the perfect horizontal angles with displacement 3 in both directions (positive and negative). Otherwise (if width/height>1), the perfect horizontal angles with displacement 1 and 3 in both directions are kept, as well as the perfect vertical angles with displacement 3 in both directions (positive and negative).

Figure 23:
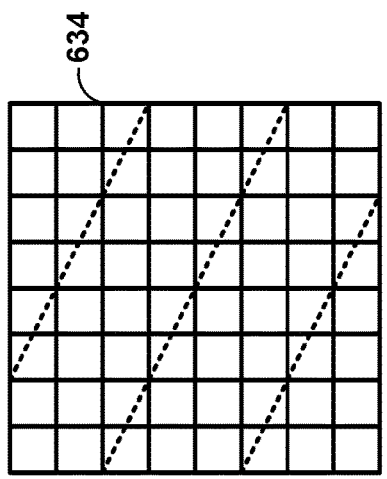
FIG. 23 is a conceptual diagram illustrating example GEO mode split lines of allowed partitions for a PU with width/height=1 according to the techniques of this disclosure.
Figure 23:
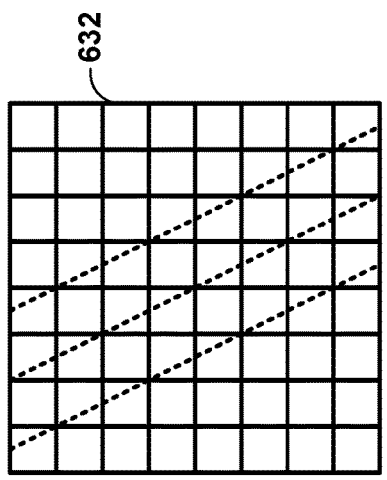
Figure 23:
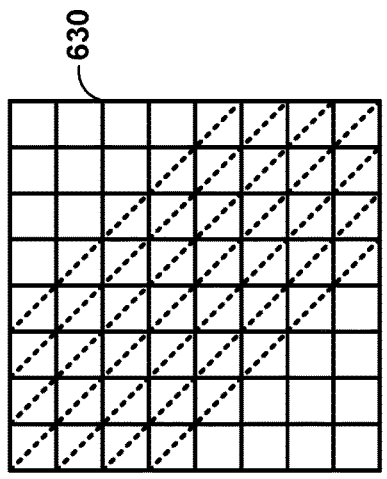
Figure 23:
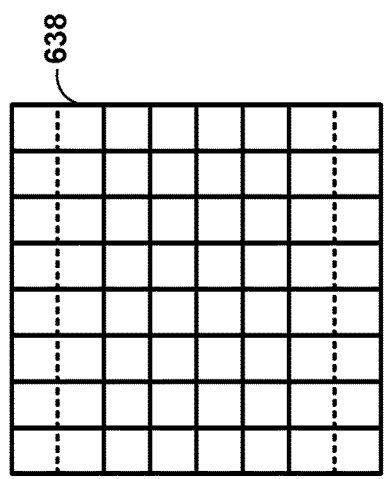
Figure 23:
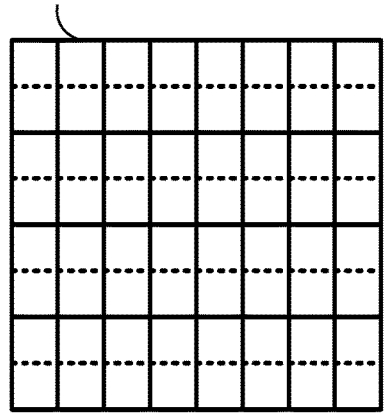

FIG. 23 is a conceptual diagram illustrating example GEO mode split lines of allowed partitions for a PU with width/height=1 (e.g., a square PU) according to the techniques of this disclosure. In the example of FIG. 23, example available GEO modes are shown in dashed lines. The rule from above being used with each PU is stated in FIG. 23. The x2 in FIG. 23 denotes that the same angles with vertical mirroring may be selected (e.g., FIG. 23 only shows angles that go from top-left to bottom-right, but the same angles can go from top-right to bottom-left). PU 630 depicts 7 GEO modes with an angle ratio of 1:1. PU 632 depicts 3 GEO modes with an angle ratio of 1:1. PU 634 shows 3 GEO modes with an angle ratio of 2:1. PU 636 depicts 4 vertical GEO modes. PU 638 depicts 2 horizontal GEO modes.

Figure 24:
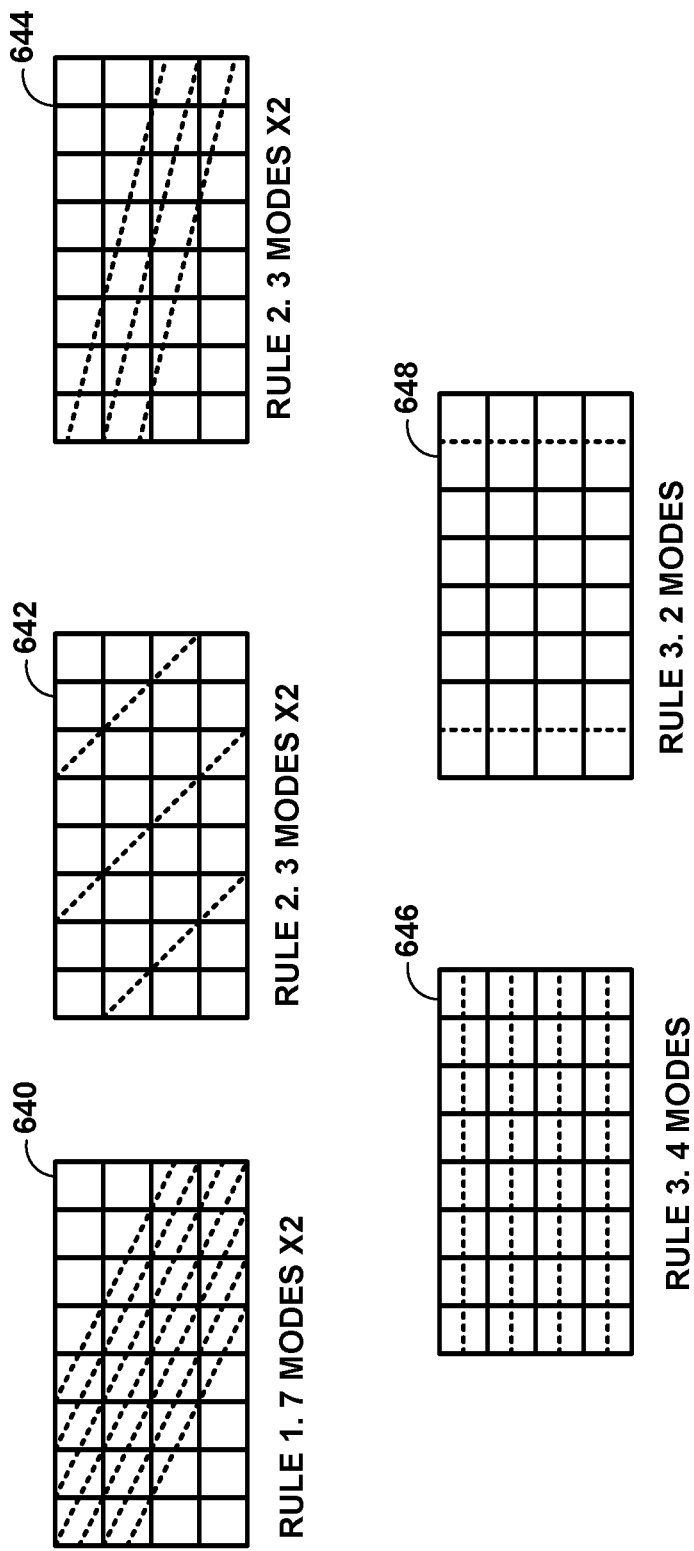
FIG. 24 is a conceptual diagram illustrating example of allowed partitions for PU with width/height=2 according to the techniques of this disclosure.

FIG. 24 is a conceptual diagram illustrating example of allowed partitions for PU with width/height=2 (e.g., a rectangular PU) according to the techniques of this disclosure. In the example of FIG. 24, example available GEO modes are shown in dashed lines. The rule from above being used with each PU is stated in FIG. 24. The x2 in FIG. 24 denotes that the same angles with vertical mirroring may be selected (e.g., FIG. 24 only shows angles that go from top-left to bottom-right, but the same angles can go from top-right to bottom-left). PU 640 depicts 7 GEO modes with an angle ratio of 2:1. PU 642 depicts 3 GEO modes with an angle ratio of 1:1. PU 644 shows 3 GEO modes with an angle ratio of 4:1. PU 646 depicts 4 horizontal GEO modes. PU 648 depicts 2 vertical GEO modes.

Figure 25:
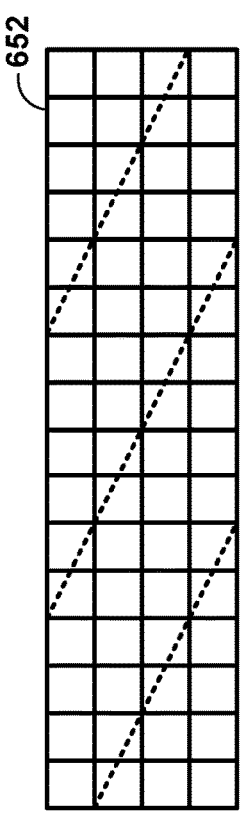
FIG. 25 is a conceptual diagram illustrating example of allowed partitions for PU with width/height=4 according to the techniques of this disclosure.
Figure 25:
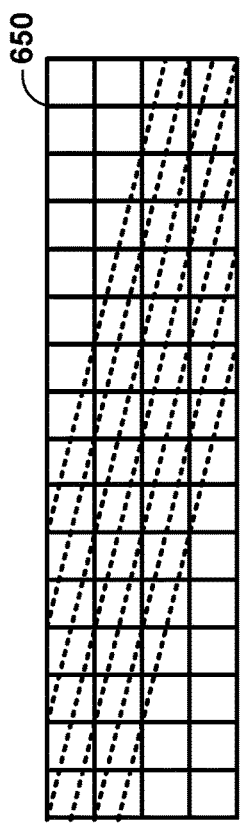
Figure 25:
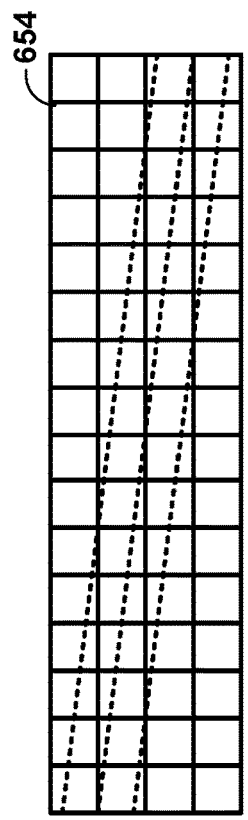
Figure 25:
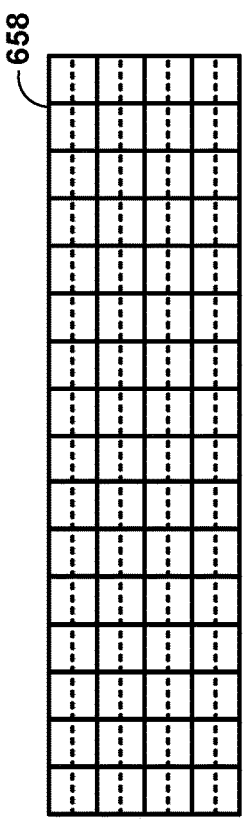
Figure 25:
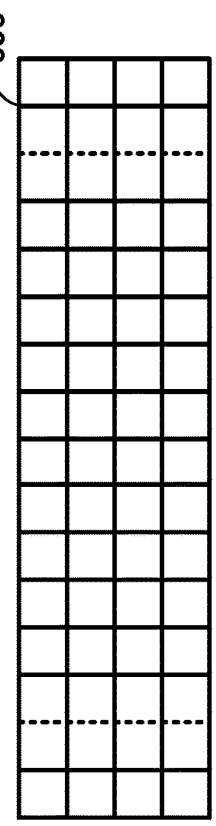

FIG. 25 is a conceptual diagram illustrating example of allowed partitions for PU with width/height=4 (e.g., a rectangular PU) according to the techniques of this disclosure. In the example of FIG. 25, example available GEO modes are shown in dashed lines. The rule from above being used with each PU is stated in FIG. 25. The x2 in FIG. 25 denotes that the same angles with vertical mirroring may be selected (e.g., FIG. 25 only shows angles that go from top-left to bottom-right, but the same angles can go from top-right to bottom-left). PU 650 depicts 7 GEO modes with an angle ratio of 4:1. PU 652 depicts 3 GEO modes with an angle ratio of 2:1. PU 654 shows 3 GEO modes with an angle ratio of 8:1. PU 656 depicts 2 vertical GEO modes. PU 658 depicts 4 horizontal GEO modes.

Figure 26:
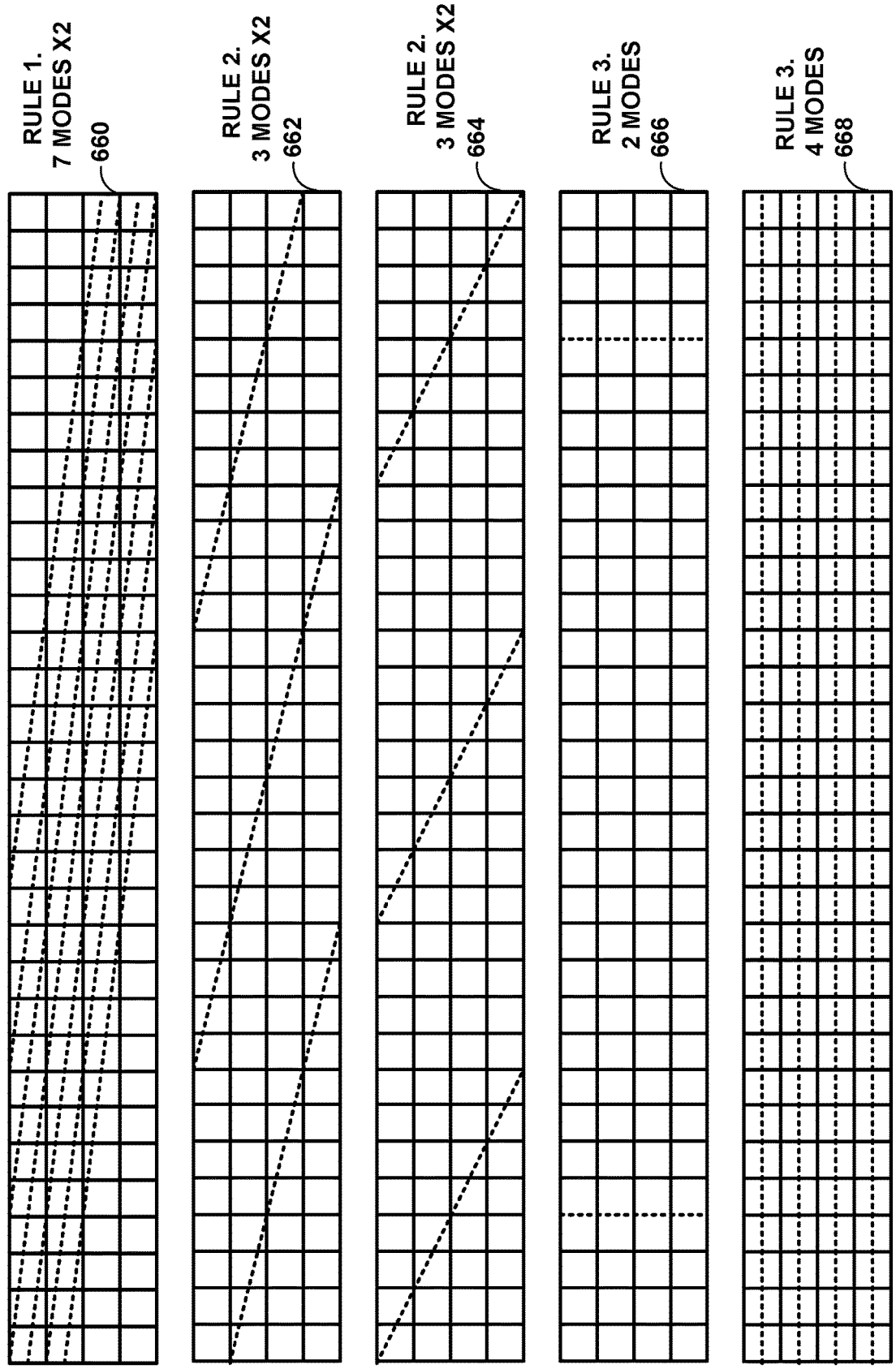
FIG. 26 is a conceptual diagram illustrating example of allowed partitions for PU with width/height=8 according to the techniques of this disclosure.

FIG. 26 is a conceptual diagram illustrating example of allowed partitions for PU with width/height=8 (e.g., a rectangular PU) according to the techniques of this disclosure. In the example of FIG. 26, example available GEO modes are shown in dashed lines. The rule from above being used with each PU is stated in FIG. 26. The x2 in FIG. 26 denotes that the same angles with vertical mirroring may be selected (e.g., FIG. 26 only shows angles that go from top-left to bottom-right but the same angles can go from top-right to bottom-left). PU 660 depicts 7 GEO modes with an angle ratio of 6:1. PU 662 depicts 3 GEO modes with an angle ratio of 4:1. PU 664 shows 3 GEO modes with an angle ratio of 2:1. PU 666 depicts 2 vertical GEO modes. PU 668 depicts 4 horizontal GEO modes.

For a PU with width/height<1, the same angles may be selected, but be rotated 90°. For example, video encoder 200 and video decoder 300 may rotate the angles 90°.

In one example, the angles with ratio 1:8, 8:1, −1:8 and −8:1 are included as potential GEO modes. The total number of modes is 106 and video encoder 200 or video decoder 300 may use a subset of 32 modes for each PU.

In some examples, rule 3 (from above) may be changed to be: Rule 3—if width/height>1 keep all 6 perfect horizontal GEO modes (e.g., the split lines are horizontal) otherwise, and if width/height<1, keep all 6 perfect vertical GEO modes (e.g., the split lines are vertical) otherwise (width/height==1), keep 4 perfect vertical Geo modes (displacement 1 and 3 in both directions (positive and negative)) and 2 perfect horizontal GEO modes (displacement 3 in both directions (positive and negative)).

In some examples, rule 3 (from above) may be changed to: Rule 3—if width/height<=1, keep the perfect vertical GEO modes (e.g., the split lines are vertical) with displacements 0, k and −k. Otherwise (if width/height<1), keep the perfect horizontal GEO modes (e.g., the split lines are horizontal) with displacements 0, k and −k. k can be 1, 2, 3. In some examples, −k may be represented. As used herein, displacement k and −k means displacement k in both directions (positive and negative)).

In some examples, instead of including the angles 8:1, 1:8, −1:8 and −8:1, for the PU with width/height=8 (resp. width/height=⅛), video encoder 200 or video decoder 300 may use the same angles as used for a PU with width/height=4 (resp. ¼).

Figure 27:
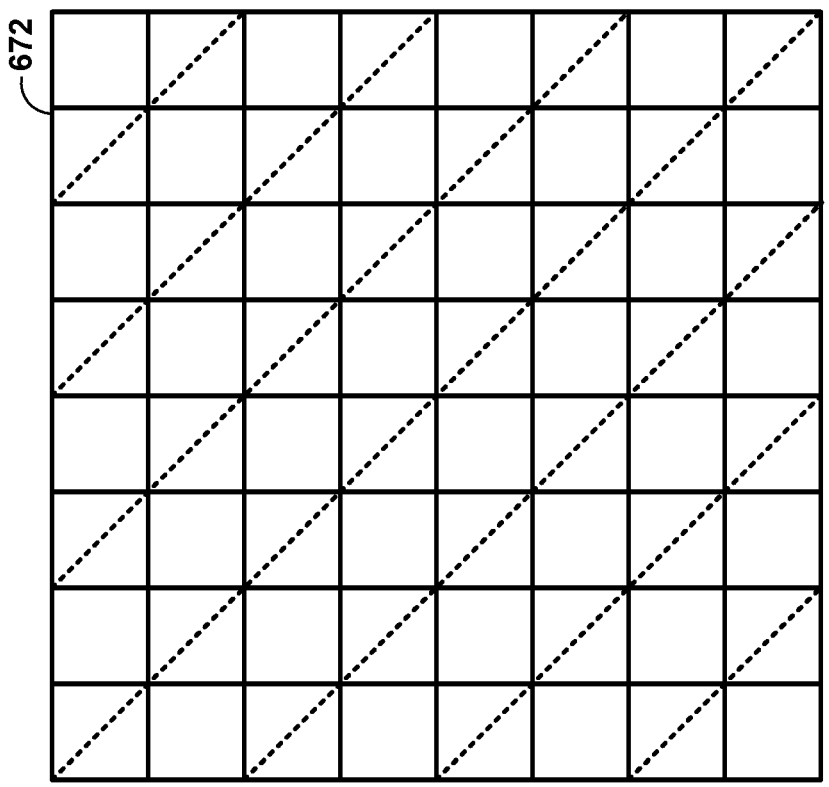
FIG. 27 is a conceptual diagram illustrating example displacement values for an angle 45° according to the techniques of this disclosure.
Figure 27:
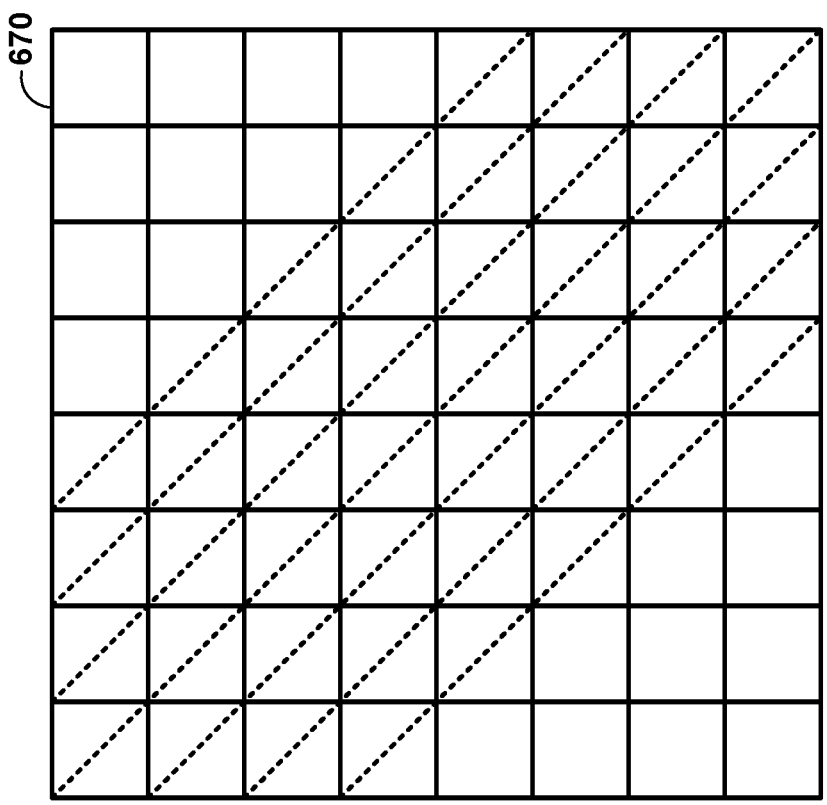

Setting a minimum displacement value is now discussed. FIG. 27 is a conceptual diagram illustrating example displacement values for an angle 45° according to the techniques of this disclosure. For example, PU 670 shows existing GEO modes with a 45° angle and displacements of −3, −2, −1, 0, 1, 2, and 3. PU 672 shows GEO modes with a 45° angle and displacements of −6, −4, −2, 0, 2, 4, and 6 according to the techniques of this disclosure. In some examples, to increase the range of the GEO modes, the minimal displacement values may be increased. In some examples, the distance used for the displacement toward the center of the block may be doubled as shown in FIG. 27. For example, video encoder 200 and video decoder 300 may double the existing displacement values.

Figure 28:
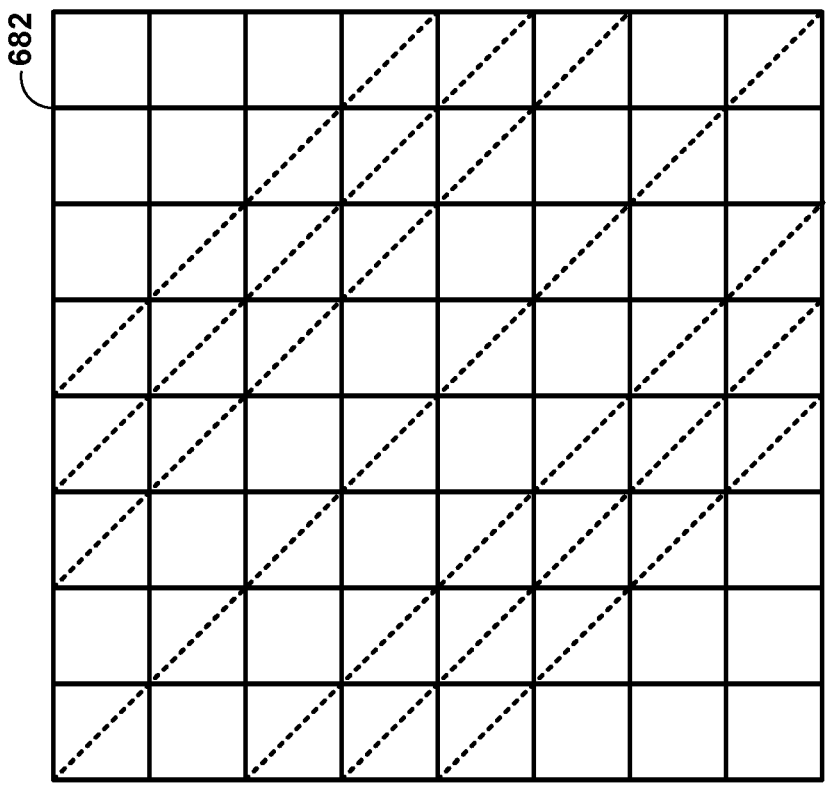
FIG. 28 is a conceptual diagram illustrating example displacement values for an angle 45° according to the techniques of this disclosure.
Figure 28:
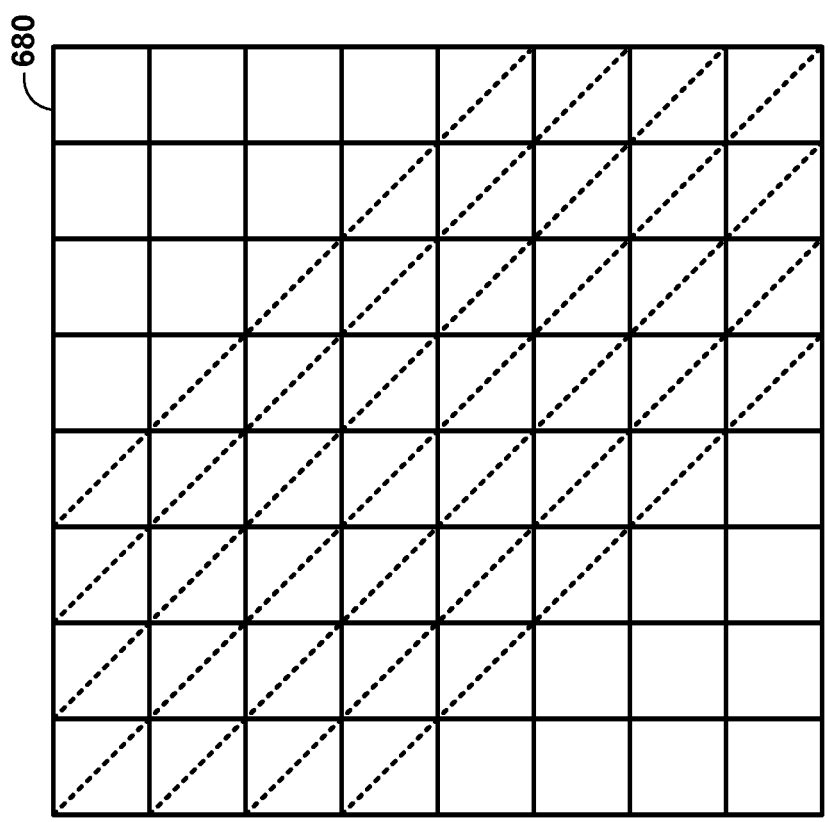

FIG. 28 is a conceptual diagram illustrating example displacement values for an angle 45° according to the techniques of this disclosure. For example, PU 680 shows existing GEO modes with a 45° angle and displacements of −3, −2, −1, 0, 1, 2, and 3. PU 682 shows GEO modes with a 45° angle and displacements of −4, −3, −2, 0, 2, 3, and 4 according to the techniques of this disclosure. In some examples, 1 may be added to the value of the displacement index, so that the angles are less close to the center of the block as shown in PU 682 of FIG. 28. For example, video encoder 200 and video decoder 300 may add 1 to the value of the displacement index.

In some examples, one or more of the techniques described above are applied only to specific block sizes. For example, video encoder 200 and video decoder 300 may determine a block size and apply one or more of the techniques in the above examples based on the block size. In some examples, one (or more) of the previous techniques is applied for all blocks with max(width, height)<=N (N can be equal to 8 or 16, for example) so that the minimum displacement is always 4 pixels. In some examples, one (or more) of the previous techniques is applied for all blocks with min(width, height)>N (N can be equal to 8 or 16, for example), so that smaller PUs do not end up with partitions that would be too small when the displacement is big.

Figure 29:
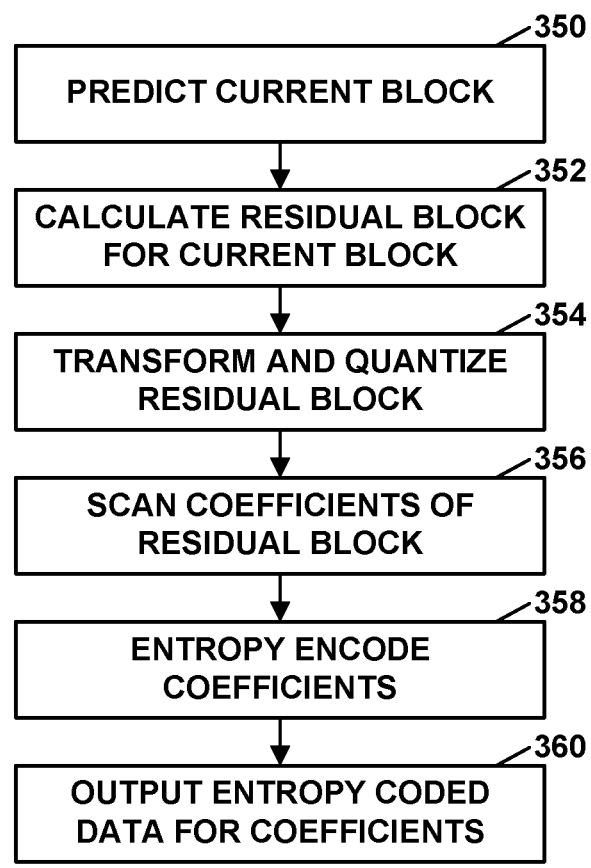
FIG. 29 is a flowchart illustrating an example of video encoding according to techniques of this disclosure.

FIG. 29 is a flowchart illustrating an example method for encoding a current block. The current block may comprise a current CU. Although described with respect to video encoder 200 (FIGS. 1 and 3), it should be understood that other devices may be configured to perform a method similar to that of FIG. 29.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 30:
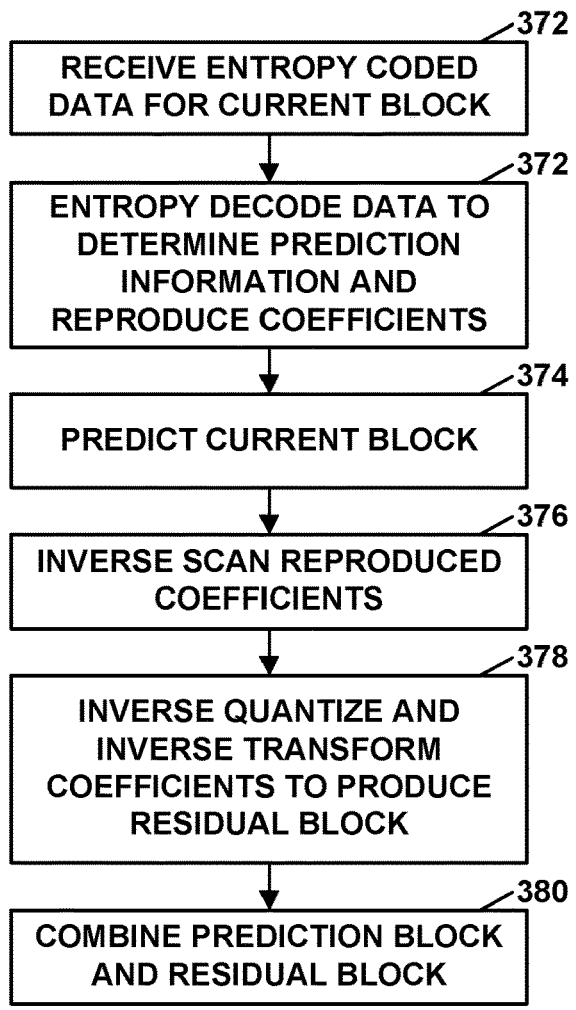
FIG. 30 is a flowchart illustrating an example of video decoding according to techniques of this disclosure.

FIG. 30 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 30.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

This disclosure contains the following examples.

Clause 1. A method of coding video data, the method comprising: limiting available GEO modes for a PU to a subset of GEO modes; and coding the video data based on the subset of GEO modes.

Clause 2. The method of clause 1, wherein the subset of GEO modes is based on a size of the PU.

Clause 3. The method of any of clauses 1-2, wherein a number of available GEO modes in the subset of GEO modes is 32.

Clause 4. The method of any combination of clauses 1-3, further comprising: determining a GEO mode signal, wherein the GEO mode signal is a variable length code.

Clause 5. The method of clause 4, wherein a first two modes of the available GEO modes are represented by two bins of the variable length code and each remaining mode of the available GEO modes are represented by one flag and a truncated binary code.

Clause 6. The method of any combination of clauses 1-5, further comprising: determining a fixed number of angles based upon a shape of a block of video data.

Clause 7. The method of clause 6, wherein the fixed number of angles are determined based on which angles from a group of predefined angles are closest to a diagonal or anti-diagonal angle of the block of video data.

Clause 8. The method of clause 1, further comprising: determining whether a neighboring PU uses a GEO mode; based on the neighboring PU using the GEO mode, only using a GEO mode on a current PU that has a same angle as the GEO mode used by the neighboring PU.

Clause 9. The method of clause 1, further comprising: determining whether a neighboring PU uses a first GEO mode; based on the neighboring PU using the first GEO mode, only using a second GEO mode on a current PU that has a same angle or a neighboring angle as the second GEO mode used by the neighboring PU.

Clause 10. The method of clause 1, further comprising: determining whether a neighboring PU uses a first GEO mode; based on the neighboring PU using the first GEO mode, only using a second GEO mode on a current PU that has a split starting point at a location of an end of a split of the neighboring PU.

Clause 11. The method of clause 1, further comprising: determining whether a neighboring PU splits on an edge of a current PU; based on the neighboring PU splitting on the edge of the current PU, only using a GEO mode on a current PU that has a split starting point at a location of the neighboring PU split.

Clause 12. The method of clause 1, wherein the subset of GEO modes is determined based on an intersection of a neighboring block partition line and a boundary of a current block.

Clause 13. The method of clause 12, wherein the intersection is either a CU partition intersection or a GEO partition intersection.

Clause 14. The method of clause 13, wherein the subset of GEO modes is determined based on the CU partition and the GEO partition.

Clause 15. The method of clause 13, wherein the subset of GEO modes is determined based on the GEO partition.

Clause 16. The method of clause 1, wherein the subset of GEO modes is determined based on a partition distance between an intersection caused by a neighboring partition and a starting point of a current partition, wherein if the partition distance of a GEO mode is smaller than a predetermined threshold, the Geo mode is included in the subset of GEO modes.

Clause 17. The method of clause 16, further comprising: determining all GEO modes having a partition distance smaller than the predetermined threshold; adding all GEO modes having a partition distance smaller than the predetermined threshold to the subset of GEO modes; determining whether the subset of GEO modes is full; and based upon the subset of GEO modes not being full, adding default GEO modes to the subset of GEO modes until the subset of GEO modes is full.

Clause 18. The method of clause 1, further comprising: adaptively determining a distance of a GEO angle.

Clause 19. The method of clause 18, further comprising: setting a number of available distance candidates to an integer N; determining whether N=1; based on N=1, inferring the distance; based on N>1, determining a distance candidate index; and selecting a distance candidate.

Clause 20. The method of clause 18, further comprising: setting a number of available distance candidates to an integer N; determining distance candidates based upon lowest partition distance; determining whether a number of distance candidates is less than N; based on the number of distance candidates being less than N, adding a default distance candidate; and selecting a distance candidate.

Clause 21. The method of clause 18, further comprising: setting a number of available distance candidates to an integer N; determining distance candidates based upon partition distance being less than a predetermined threshold; determining whether a number of distance candidates is less than N; based on the number of distance candidates being less than N, adding a default distance candidate; and selecting a distance candidate.

Clause 22. The method of any combination of clauses 18-21, further comprising setting a flag if a mode is used.

Clause 23. The method of clause 1, wherein GEO modes with angles associated with diagonal and anti-diagonal are coded in 2 bins and remaining GEO modes are coded using a truncated binary code, the truncated binary code having a maximum number of bits of a total number of GEO partitions minus 2.

Clause 24. The method of clause 1, further comprising: maintaining table of GEO modes ordered based on usage, wherein a signaling cost most frequently used modes is shorter than a signaling cost of least frequently used modes.

Clause 25. The method of clause 24, further comprising: maintaining a counter for a GEO mode; increasing a count in the counter for the GEO mode when the GEO mode is used; determining whether the count in the counter is equal to or greater than a predetermined threshold; and based on the count in the counter being equal to or greater than the predetermined threshold, moving the GEO mode in the table so as to decrease the signaling cost of the GEO mode.

Clause 26. The method of clause 24, further comprising: determining a GEO mode in the table of GEO modes is used; and exchanging the GEO mode in the table with a neighboring GEO mode in the table.

Clause 27. The method of clause 24, wherein the table is a two-entry list which is reformed using a GEO mode of a causal neighboring block to a current block.

Clause 28. The method of clause 27, wherein if both a left and an above block are GEO-coded, the table is one of {GEOleft, GEOabove} or {GEOabove, GEOleft}.

Clause 29. The method of clause 27 or 28, wherein if only one of a left and above blocks are GEO-coded, the table is {GEOleft, GEOdefault} if left block is GEO-coded or {GEOabove, GEOdefault} if above block is GEO-coded, wherein GEOdefault is either diagonal angle with zero distance offset or anti-diagonal angle with zero distance offset.

Clause 30. The method of any combination of clauses 27-29, wherein if neither a left block nor an above block is GEO-coded, the table is one of {diagonal angle with zero distance offset, anti-diagonal angle with zero distance offset} or {anti-diagonal angle with zero distance offset, diagonal angle with zero distance offset}.

Clause 31. The method of any combination of clauses 27-30, wherein a left block or an above block are regarded as unavailable if the left block or above block crosses a tile/slice/sub-picture boundary, wherein a current tile/slice/subpicture is independent to a tile/slice/subpicture of the left block or the tile/slice/subpicture of the above block.

Clause 32. The method of any combination of clauses 27-31, further comprising: determining whether a current tile/slice/subpicture is independent of a causal neighboring tile/slice/subpicture; and based upon the current tile/slice/subpicture being independent of the causal neighboring tile/slice/subpicture, refreshing the table across a tile/slice/subpicture boundary.

Clause 33. The method of any combination of clauses 1-32, further comprising: quantizing a cosine based on a Dis table, wherein the Dis table comprises an entry of 2 for a 45 degree angle, −2 for a 135 degree angle, −2 for a 225 degree angle and 2 for a 315 degree angle.

Clause 34. A method of video coding comprising: calculating a distance of a sample to a split line based on:

$$distFromLine=Dis[displacementX]((((x+offsetX)<<1)+1)+(((y+offsetY)<<1)+1)\times tan[displacementX])-\rho$$

when displacementX corresponds to an angle with a tangent above 1, and $$distFromLine=Dis[displacementY]((((x+offsetX)<<1)+1)\times cot[displacementX]+(((y+offsetY)<<1)+1))-\rho$$

when displacement corresponds to an angle with a tangent below 1.

Clause 35. The method of any of clauses 1-34, wherein coding comprises decoding.

Clause 36. The method of any of clauses 1-35, wherein coding comprises encoding.

Clause 37. A device for coding video data, the device comprising one or more means for performing the method of any of clauses 1-36.

Clause 38. The device of clause 37, wherein the one or more means comprise one or more processors implemented in circuitry.

Clause 39. The device of any of clauses 37 and 38, further comprising a memory to store the video data.

Clause 40. The device of any of clauses 37-39, further comprising a display configured to display decoded video data.

Clause 41. The device of any of clauses 37-40, wherein the device comprises one or more of a camera, a computer, a mobile device, a broadcast receiver device, or a set-top box.

Clause 42. The device of any of clauses 37-41, wherein the device comprises a video decoder.

Clause 43. The device of any of clauses 37-42, wherein the device comprises a video encoder.

Clause 44. A computer-readable storage medium having stored thereon instructions that, when executed, cause one or more processors to perform the method of any of clauses 1-36.

Clause 1A. A method of coding video data, the method comprising: determining an angle of a split line of a current block of video data; determining a displacement based on the angle; and coding the current block of video data based on the displacement and the angle.

Clause 2A. The method of clause 1A, wherein the displacement is based on a width of the angle when the angle is vertical and the displacement is based on a height of the angle when the angle is non-vertical wherein the angle is vertical if the width of the angle is less than the height of the angle.

Clause 3A. The method of clause 1A, wherein the displacement is based on a width of the angle when the angle is horizontal and the displacement is based on a height of the angle when the angle is non-horizontal wherein the angle is horizontal if the width of the angle is greater than the height of the angle.

Clause 4A. The method of any combination of clauses 1A-3A, further comprising: determining whether the current block of video data is square.

Clause 5A. A method of coding video data, the method comprising: determining a width-to-height ratio of a current block of video data; based on the width-to-height ratio, selecting a subset of GEO modes; and coding the current block of video data using a GEO mode from the subset of GEO modes.

Clause 6A. The method of clause 5A, wherein the subset of GEO modes comprises GEO modes with an angle ratio equal to the width-to-height ratio.

Clause 7A. The method of clause 6A, wherein the subset of GEO modes comprises GEO modes with displacement values of −3, −2, −1, 0, 1, 2 or 3.

Clause 8A. The method of clause 5A, wherein the subset of GEO modes comprises GEO modes with an angle ratio neighboring the width-to-height ratio.

Clause 9A. The method of clause 8A, wherein the subset of GEO modes comprises GEO modes with displacement values of −3, 0 or 3.

Clause 10A. The method of clause 5A, wherein based on the width-to-height ratio being less or equal to one, the subset of GEO modes comprises GEO modes having perfect vertical angles with displacement values of −3, −1, 1 or 3 and perfect horizontal angles with displacement values of −3 or 3.

Clause 11A. The method of clause 5A, wherein based on the width-to-height ratio being greater than one, the subset of GEO modes comprises GEO modes having perfect horizontal angles with displacement values of −3, −1, 1 or 3 and perfect vertical angles with displacement values of −3 or 3.

Clause 12A. The method of any combination of clauses 5A-11A, further comprising based on the width-to-height ratio being less than one, rotating a GEO mode angle line 90 degrees.

Clause 13A. The method of any combination of clauses 5A-12A, wherein the subset of GEO modes comprise GEO modes with angle ratios of 1:8, 8:1, −1:8 or −8:1.

Clause 14A. The method of clause 5A, wherein based on the width-to-height ratio being greater than one, the subset of GEO modes comprises GEO modes having perfect horizontal angles.

Clause 15A. The method of clause 5A, wherein based on the width-to-height ratio being less than one, the subset of GEO modes comprises GEO modes having perfect vertical angles.

Clause 16A. The method of clause 5A, wherein based on the width-to-height ratio being equal to one, the subset of GEO modes comprises GEO modes having perfect vertical angles with displacement values of −3, −1, 1 or 3 and perfect horizontal angles with displacement values of −3 or 3.

Clause 17A. The method of clause 5A, wherein based on the width-to-height ratio being less or equal to one, the subset of GEO modes comprises GEO modes having perfect vertical angles with displacement values of one, k or −k, wherein k represents displacement values of 1, 2 or 3.

Clause 18A. The method of clause 5A, wherein based on the width-to-height ratio being greater than one, the subset of GEO modes comprises GEO modes having perfect horizontal angles with displacement values of one, k or −k, wherein k represents displacement values of 1, 2 or 3.

Clause 19A. The method of any combination of clauses 5A-18A, wherein the subset of GEO modes comprise GEO modes with angle ratios of 1:4, 4:1, −1:4 or −4:1.

Clause 20A. The method of any combination of clauses 1A-19A, further comprising doubling a displacement value.

Clause 21A. The method of any combination of clauses 1A-20A, further comprising adding 1 to a displacement index.

Clause 22A. The method of any combination of clauses 1A-21A, further comprising: determining whether a max(width, height) of the current block of video data is less than or equal to N; and based on the max(width, height) of the current block of video data being less than or equal to N, applying any methods above, wherein N is a predetermined number.

Clause 23A. The method of any combination of clauses 1A-22A, further comprising: determining whether a max(width, height) of the current block of video data is greater than N; and based on the max(width, height) of the current block of video data being greater than N, applying any methods above, wherein N is a predetermined number.

Clause 24A. The method of any combination of clauses 5A-23A, wherein the subset of GEO modes are stored in a table.

Clause 25A. The method of clause 24A, wherein the most probable GEO modes are located in a front of the table.

Clause 26A. The method of any combination of clauses 5A-25A, further comprising determining a SPS flag.

Clause 27A. The method of any of clauses 1A-26A, wherein coding comprises decoding.

Clause 28A. The method of any of clauses 1A-27A, wherein coding comprises encoding.

Clause 29A. A device for coding video data, the device comprising one or more means for performing the method of any of clauses 1A-28A.

Clause 30A. The device of clause 29A, wherein the one or more means comprise one or more processors implemented in circuitry.

Clause 31A. The device of any of clauses 29A and 30A, further comprising a memory to store the video data.

Clause 32A. The device of any of clauses 29A-31A, further comprising a display configured to display decoded video data.

Clause 33A. The device of any of clauses 29A-32A, wherein the device comprises one or more of a camera, a computer, a mobile device, a broadcast receiver device, or a set-top box.

Clause 34A. The device of any of clauses 29A-33A, wherein the device comprises a video decoder.

Clause 35A. The device of any of clauses 29A-34A, wherein the device comprises a video encoder.

Clause 36A. A computer-readable storage medium having stored thereon instructions that, when executed, cause one or more processors to perform the method of any of clauses 1A-28A.

Clause 37A. A device for encoding video data, the device comprising: means for determining an angle of a split line of a current block of video data; means for determining a displacement based on the angle; and means for coding the current block of video data based on the displacement.

Clause 38A. A device for encoding video data, the device comprising: means for determining a width-to-height ratio of a current block of video data; means for selecting a subset of GEO modes based on the width-to-height ratio; and means for coding the current block of video data using a GEO mode from the subset of GEO modes.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a first distance index associated with a first geometric partition mode (GEO) angle for a first prediction unit (PU) of the video data to be 4;
   determining, based on the first distance index, a first displacement value indicative of a distance from a center of the first PU to a GEO split such that a location of the GEO split is determined; and
   decoding the first PU based on the first GEO angle and the first displacement value,
   wherein the first displacement value is half of a displacement value associated with a distance index of 2.

2. The method of claim 1, wherein determining the first displacement value comprises looking up the first distance index of 4 in a look-up table.

3. The method of claim 1, wherein the first displacement value is associated with a quantization level of a cosine of the first GEO angle.

4. The method of claim 1, further comprising:
   determining a second distance index associated with a second GEO angle for a second PU of the video data to be 12;
   determining a second displacement value based on the second distance index; and
   decoding the second PU based on the second GEO angle and the second displacement value,
   wherein the second displacement value is half a displacement value associated with a distance index of 14.

5. The method of claim 1, further comprising:
   determining a second distance index associated with a second GEO angle for a second PU of the video data to be 20;
   determining a second displacement value based on the second distance index; and
   decoding the second PU based on the second GEO angle and the second displacement value,
   wherein the second displacement value is half a displacement value associated with a distance index of 18.

6. The method of claim 1, further comprising:
   determining a second distance index associated with a second GEO angle for a second PU of the video data to be 28;
   determining a second displacement value based on the second distance index; and
   decoding the second PU based on the second GEO angle and the second displacement value,
   wherein the second displacement value is half a displacement value associated with a distance index of 30.

7. A device for decoding video data, the device comprising:
   a memory configured to store the video data; and
   one or more processors implemented in circuitry and coupled to the memory, the one or more processors being configured to:
      determine a first distance index associated with a first geometric partition mode (GEO) angle for a first prediction unit (PU) of the video data to be 4;
      determine, based on the first distance index, a first displacement value indicative of a distance from a center of the first PU to a GEO split such that a location of the GEO split is determined; and
      decode the first PU based on the first GEO angle and the first displacement value, wherein the first displacement value is half of a displacement value associated with a distance index of 2.

8. The device of claim 7, wherein the one or more processors determine the first displacement value by looking up the first distance index of 4 in a look-up table.

9. The device of claim 7, wherein the first displacement value is associated with a quantization level of a cosine of the first GEO angle.

10. The device of claim 7, wherein the one or more processors are further configured to:
determine a second distance index associated with a second GEO angle for a second PU of the video data to be 12;
determine a second displacement value based on the second distance index; and
decode the second PU based on the second GEO angle and the second displacement value,
wherein the second displacement value is half a displacement value associated with a distance index of 14.

11. The device of claim 7, further comprising:
determine a second distance index associated with a second GEO angle for a second PU of the video data to be 20;
determine a second displacement value based on the second distance index; and
decode the second PU based on the second GEO angle and the second displacement value,
wherein the second displacement value is half a displacement value associated with a distance index of 18.

12. The device of claim 7, wherein the one or more processors are further configured to:
determine a second distance index associated with a second GEO angle for a second PU of the video data to be 28;
determine a second displacement value based on the second distance index; and
decode the second PU based on the second GEO angle and the second displacement value,
wherein the second displacement value is half a displacement value associated with a distance index of 30.

13. The device of claim 7, further comprising:
a display coupled to the one or more processors, the display being configured to display the video data.

14. A method of encoding video data, the method comprising:
determining a first geometric partition mode (GEO) angle for a first prediction unit (PU) of the video data to be 45 degrees;
based on the first GEO angle being 45 degrees, determining a first distance index for the first PU to be 4;
determining a first displacement value indicative of a distance from a center of the first PU to a GEO split, the first displacement value being associated with the first distance index; and
encoding the first PU based on the first GEO angle and the first displacement value,
wherein the first displacement value is half of a displacement value associated with a distance index of 2.

15. The method of claim 14, wherein determining the first displacement value comprises looking up the first distance index of 4 in a look-up table.

16. The method of claim 14, wherein the first displacement value is associated with a quantization level of a cosine of the first GEO angle.

17. The method of claim 14, further comprising:
determining a second GEO angle for a second PU of the video data to be 135 degrees;
based on the second GEO angle being 135 degrees, determining a second distance index for the second PU to be 12;
determining a second displacement value based on the second distance index; and
encoding the second PU based on the second GEO angle and the second displacement value,
wherein the second displacement value is half a displacement value associated with a distance index of 14.

18. The method of claim 14, further comprising:
determining a second GEO angle for a second PU of the video data to be 225 degrees;
based on the second GEO angle being 225 degrees, determining a second distance index for the second PU to be 20;
determining a second displacement value based on the second distance index; and
encoding the second PU based on the second GEO angle and the second displacement value,
wherein the second displacement value is half a displacement value associated with a distance index of 18.

19. The method of claim 14, further comprising:
determining a second GEO angle for a second PU of the video data to be 315 degrees;
based on the second GEO angle being 315 degrees, determining a second distance index for the second PU to be 28;
determining a second displacement value based on the second distance index; and
encoding the second PU based on the second GEO angle and the second displacement value,
wherein the second displacement value is half a displacement value associated with a distance index of 30.

20. A device for encoding video data, the device comprising:
a memory configured to store the video data; and
one or more processors implemented in circuitry and coupled to the memory, the one or more processors being configured to:
determine a first geometric partition mode (GEO) angle for a first prediction unit (PU) of the video data to be 45 degrees;
based on the first GEO angle being 45 degrees, determine a first distance index for the first PU to be 4;
determining a first displacement value indicative of a distance from a center of the first PU to a GEO split, the first displacement value being associated with the first distance index; and
encode the first PU based on the first GEO angle and the first displacement value,
wherein the first displacement value is half of a displacement value associated with a distance index of 2.

21. The device of claim 20, wherein the one or more processors determine the first displacement value by looking up the first distance index of 4 in a look-up table.

22. The device of claim 20, wherein the first displacement value is associated with a quantization level of a cosine of the first GEO angle.

23. The device of claim 20, wherein the one or more processors are further configured to:
determine a second GEO angle for a second PU of the video data to be 135 degrees;
based on the second GEO angle being 135 degrees, determine a second distance index for the second PU to be 12;

determine a second displacement value based on the second distance index; signaling the second distance index; and encode the second PU based on the second GEO angle and the second displacement value, wherein the second displacement value is half a displacement value associated with a distance index of 14.

24. The device of claim 20, wherein the one or more processors are further configured to:

determine a second GEO angle for a second PU of the video data to be 225 degrees;

based on the second GEO angle being 225 degrees, determine a second distance index for the second PU to be 20;

determine a second displacement value based on the second distance index; and encode the second PU based on the second GEO angle and the second displacement value, wherein the second displacement value is half a displacement value associated with a distance index of 18.

25. The device of claim 20, wherein the one or more processors are further configured to:

determine a second GEO angle for a second PU of the video data to be 315 degrees;

based on the second GEO angle being 315 degrees, determine a second distance index for the second PU to be 28;

determine a second displacement value based on the second distance index; and encode the second PU based on the second GEO angle and the second displacement value, wherein the second displacement value is half a displacement value associated with a distance index of 30.

26. The device of claim 20, further comprising:

a camera coupled to the one or more processors, the camera being configured to capture the video data.

* * * * *